| (12) United States Patent | (10) Patent No.: US 9,015,641 B2 |
|---|---|
| Bocking et al. | (45) Date of Patent: Apr. 21, 2015 |

(54) ELECTRONIC DEVICE AND METHOD OF PROVIDING VISUAL NOTIFICATION OF A RECEIVED COMMUNICATION

(75) Inventors: Andrew Douglas Bocking, Conestogo (CA); Donald James Lindsay, Mountain View, CA (US); Daniel Tobias Rydenhag, Gothenburg (SE)

(73) Assignee: Blackberry Limited, Waterloo, Ontario (CA)

( * ) Notice: Subject to any disclaimer, the term of this patent is extended or adjusted under 35 U.S.C. 154(b) by 73 days.

(21) Appl. No.: 13/584,350

(22) Filed: Aug. 13, 2012

(65) Prior Publication Data

US 2013/0145295 A1   Jun. 6, 2013

Related U.S. Application Data

(63) Continuation-in-part of application No. 13/036,186, filed on Feb. 28, 2011, and a continuation-in-part of application No. 13/309,227, filed on Dec. 1, 2011, and a continuation-in-part of application No. 13/405,193, filed on Feb. 24, 2012.

(51) Int. Cl.
| *G06F 3/0481* | (2013.01) |
| *G06F 3/01* | (2006.01) |
| *H04M 1/725* | (2006.01) |
| *G06F 3/0488* | (2013.01) |

(52) U.S. Cl.
CPC ........... *G06F 3/017* (2013.01); *H04M 1/72547* (2013.01); *G06F 3/04883* (2013.01)

(58) Field of Classification Search
CPC ..... G06F 3/017; G06F 3/0487; G06F 3/0488; G06F 3/0481; G06F 3/0482; G06F 3/04883

USPC ................................................... 715/764, 863
See application file for complete search history.

(56) References Cited

U.S. PATENT DOCUMENTS

| 5,305,435 A | 4/1994 | Bronson |
|---|---|---|
| 5,570,109 A | 10/1996 | Jenson |
| 5,651,107 A | 7/1997 | Frank et al. |

(Continued)

FOREIGN PATENT DOCUMENTS

| CN | 1834887 | 9/2006 |
|---|---|---|
| EP | 2015176 A1 | 1/2009 |

(Continued)

OTHER PUBLICATIONS

"User Guide" Samsung Epic 4G, A Galaxy S Phone, Sprint Oct. 8, 2010, pp. 268.

(Continued)

*Primary Examiner* — Amy Ng
*Assistant Examiner* — Roland Casillas
(74) *Attorney, Agent, or Firm* — Hanley, Flight & Zimmerman, LLC

(57) ABSTRACT

A method includes displaying information associated with an application on an electronic device, providing a visual notification of a received communication, and detecting a gesture. In response to detecting the gesture, a first part of an inbox is displayed while reducing display of the information, including at least partially displaying information associated with the received communication. Based on a characteristic of the gesture, providing the visual notification is discontinued.

34 Claims, 11 Drawing Sheets

(56) References Cited

U.S. PATENT DOCUMENTS

| | | |
|---|---|---|
| 5,668,960 A | 9/1997 | Kataoka |
| 6,073,109 A | 6/2000 | Flores et al. |
| 6,133,898 A | 10/2000 | Ludolph et al. |
| 6,333,973 B1 | 12/2001 | Smith et al. |
| 6,584,181 B1 | 6/2003 | Aktas et al. |
| 7,079,160 B2 | 7/2006 | Colavin |
| 7,250,955 B1 | 7/2007 | Beeman et al. |
| 7,283,808 B2 | 10/2007 | Castell et al. |
| 7,308,653 B2 | 12/2007 | Lin-Hendel |
| 7,370,284 B2 | 5/2008 | Andrea et al. |
| 7,385,875 B2 | 6/2008 | May et al. |
| 7,430,409 B2 | 9/2008 | Klassen et al. |
| 7,484,213 B2 | 1/2009 | Mathew et al. |
| 7,539,945 B2 | 5/2009 | Conrad et al. |
| 7,642,901 B2 | 1/2010 | Kato et al. |
| 7,647,559 B2 | 1/2010 | Yozell-Epstein et al. |
| 7,752,279 B2 | 7/2010 | Hardy et al. |
| 7,774,418 B2 | 8/2010 | Tang et al. |
| 7,782,307 B2 | 8/2010 | Westerman et al. |
| 7,802,206 B1 | 9/2010 | Davis et al. |
| 7,809,162 B2 | 10/2010 | Steinberg et al. |
| 7,812,828 B2 | 10/2010 | Westerman et al. |
| 7,812,860 B2 | 10/2010 | King et al. |
| 7,826,641 B2 | 11/2010 | Mandella et al. |
| 7,844,076 B2 | 11/2010 | Corcoran et al. |
| 7,844,915 B2 | 11/2010 | Platzer et al. |
| 7,848,549 B2 | 12/2010 | Steinberg et al. |
| 7,860,274 B2 | 12/2010 | Steinberg et al. |
| 7,861,169 B2 | 12/2010 | Hull et al. |
| 7,884,846 B2 | 2/2011 | Ferren et al. |
| 7,899,915 B2 | 3/2011 | Reisman |
| 7,900,074 B2 | 3/2011 | Reece et al. |
| 7,904,828 B2 | 3/2011 | Conrad et al. |
| 7,937,672 B2 | 5/2011 | Casto |
| 7,996,045 B1 * | 8/2011 | Bauer et al. .................. 455/566 |
| 8,032,482 B2 | 10/2011 | Rosenberg et al. |
| 8,032,597 B2 | 10/2011 | Khoo |
| 8,082,518 B2 | 12/2011 | Flake et al. |
| 8,099,681 B2 | 1/2012 | Flanagan et al. |
| 8,122,364 B2 | 2/2012 | Yozell-Epstein et al. |
| 8,134,727 B1 | 3/2012 | Shmunis et al. |
| 8,140,115 B1 | 3/2012 | Kahn et al. |
| 8,140,975 B2 | 3/2012 | Lemay et al. |
| 8,176,411 B2 | 5/2012 | Palmieri |
| 8,224,391 B2 | 7/2012 | Kim et al. |
| 8,237,664 B2 | 8/2012 | Swanbufg et al. |
| 8,239,785 B2 | 8/2012 | Hinckley et al. |
| 8,249,664 B1 | 8/2012 | Bauer et al. |
| 8,253,695 B2 | 8/2012 | Ganatra et al. |
| 8,261,213 B2 | 9/2012 | Hinckley et al. |
| 8,271,660 B2 | 9/2012 | Schulzrinne et al. |
| 8,271,907 B2 | 9/2012 | Kim et al. |
| 8,280,962 B2 | 10/2012 | Muniz et al. |
| 8,291,344 B2 | 10/2012 | Chaudhri |
| 8,296,332 B2 | 10/2012 | Boley et al. |
| 8,300,005 B2 | 10/2012 | Tateuchi et al. |
| 8,301,701 B2 | 10/2012 | Goodman et al. |
| 8,356,256 B2 | 1/2013 | Olsen |
| 8,359,017 B2 | 1/2013 | Bruchelt |
| 8,359,335 B2 | 1/2013 | Coker et al. |
| 8,392,837 B2 | 3/2013 | Li |
| 8,402,384 B2 | 3/2013 | Scott |
| 8,453,057 B2 | 5/2013 | Stallings et al. |
| 8,473,843 B2 | 6/2013 | Lundy et al. |
| 8,473,870 B2 | 6/2013 | Hinckley et al. |
| 8,479,122 B2 | 7/2013 | Hotelling et al. |
| 8,510,677 B2 | 8/2013 | van Os |
| 8,539,384 B2 | 9/2013 | Hinckley et al. |
| 8,650,501 B2 | 2/2014 | Arnold et al. |
| 8,681,112 B2 | 3/2014 | Singhal |
| 8,689,146 B2 | 4/2014 | Lazaridis et al. |
| 8,711,416 B1 | 4/2014 | Byer et al. |
| 8,726,198 B2 | 5/2014 | Rydenhag et al. |
| 8,745,141 B2 | 6/2014 | Rosenberg et al. |
| 2001/0028365 A1 | 10/2001 | Ludolph |
| 2002/0098831 A1 | 7/2002 | Castell et al. |
| 2002/0126155 A1 | 9/2002 | Lin-Hendel |
| 2003/0070000 A1 | 4/2003 | Coker et al. |
| 2004/0068545 A1 | 4/2004 | Daniell et al. |
| 2004/0117451 A1 | 6/2004 | Chung |
| 2004/0128353 A1 | 7/2004 | Goodman et al. |
| 2004/0196259 A1 | 10/2004 | Bradski |
| 2004/0243677 A1 | 12/2004 | Curbow et al. |
| 2005/0001848 A1 | 1/2005 | Colavin |
| 2005/0108655 A1 | 5/2005 | Andrea et al. |
| 2006/0026521 A1 | 2/2006 | Hotelling et al. |
| 2006/0075046 A1 | 4/2006 | Yozell-Epstein et al. |
| 2006/0101350 A1 | 5/2006 | Scott |
| 2006/0123360 A1 | 6/2006 | Anwar et al. |
| 2006/0156240 A1 | 7/2006 | Lemay et al. |
| 2006/0190833 A1 | 8/2006 | Sangiovanni et al. |
| 2006/0250377 A1 | 11/2006 | Zadesky et al. |
| 2006/0256082 A1 | 11/2006 | Cho et al. |
| 2006/0270461 A1 | 11/2006 | Won et al. |
| 2006/0284852 A1 | 12/2006 | Hofmeister et al. |
| 2007/0011258 A1 | 1/2007 | Khoo |
| 2007/0016958 A1 | 1/2007 | Bodepudi et al. |
| 2007/0038718 A1 | 2/2007 | Khoo et al. |
| 2007/0083600 A1 | 4/2007 | Bakos et al. |
| 2007/0106939 A1 | 5/2007 | Qassoudi |
| 2007/0139372 A1 | 6/2007 | Swanburg et al. |
| 2007/0150842 A1 | 6/2007 | Chaudhri et al. |
| 2007/0152977 A1 | 7/2007 | Ng et al. |
| 2007/0220444 A1 | 9/2007 | Sunday et al. |
| 2007/0236468 A1 | 10/2007 | Tuli |
| 2007/0256035 A1 | 11/2007 | Matsuzawa et al. |
| 2007/0271376 A1 | 11/2007 | Yach |
| 2008/0005247 A9 | 1/2008 | Khoo |
| 2008/0008163 A1 | 1/2008 | Castell et al. |
| 2008/0034047 A1 | 2/2008 | Rosenberg et al. |
| 2008/0046824 A1 | 2/2008 | Li et al. |
| 2008/0065758 A1 | 3/2008 | Narayanaswami |
| 2008/0094369 A1 | 4/2008 | Ganatra et al. |
| 2008/0165151 A1 | 7/2008 | Lemay et al. |
| 2008/0165160 A1 | 7/2008 | Kocienda |
| 2008/0174570 A1 | 7/2008 | Jobs et al. |
| 2008/0189622 A1 | 8/2008 | Sanchez et al. |
| 2008/0220747 A1 | 9/2008 | Ashkenazi et al. |
| 2008/0231601 A1 | 9/2008 | Fyke et al. |
| 2008/0261569 A1 | 10/2008 | Britt et al. |
| 2008/0272927 A1 | 11/2008 | Woolley et al. |
| 2008/0273014 A1 | 11/2008 | Lowles et al. |
| 2009/0006991 A1 | 1/2009 | Lindberg et al. |
| 2009/0007017 A1 | 1/2009 | Anzures et al. |
| 2009/0013282 A1 | 1/2009 | Mercer |
| 2009/0049407 A1 | 2/2009 | Casto |
| 2009/0064055 A1 | 3/2009 | Chaudhri et al. |
| 2009/0094562 A1 | 4/2009 | Jeong et al. |
| 2009/0119678 A1 | 5/2009 | Shih et al. |
| 2009/0144661 A1 | 6/2009 | Nakajima et al. |
| 2009/0174679 A1 | 7/2009 | Westerman |
| 2009/0177754 A1 | 7/2009 | Brezina et al. |
| 2009/0178006 A1 | 7/2009 | Lemay et al. |
| 2009/0195518 A1 | 8/2009 | Mattice et al. |
| 2009/0199130 A1 | 8/2009 | Tsern et al. |
| 2009/0237367 A1 | 9/2009 | Ryu et al. |
| 2009/0241072 A1 | 9/2009 | Chaudhri et al. |
| 2009/0249247 A1 | 10/2009 | Tseng et al. |
| 2009/0252312 A1 | 10/2009 | Muniz et al. |
| 2009/0267909 A1 | 10/2009 | Chen et al. |
| 2009/0273583 A1 | 11/2009 | Norhammar |
| 2009/0278806 A1 | 11/2009 | Duarte et al. |
| 2009/0292690 A1 | 11/2009 | Culbert |
| 2009/0295753 A1 | 12/2009 | King et al. |
| 2009/0307631 A1 | 12/2009 | Kim et al. |
| 2009/0307710 A1 | 12/2009 | Zarzychi et al. |
| 2010/0011304 A1 | 1/2010 | Van Os |
| 2010/0013782 A1 | 1/2010 | Liu et al. |
| 2010/0017695 A1 | 1/2010 | Palmieri |
| 2010/0042954 A1 | 2/2010 | Rosenblatt et al. |
| 2010/0050076 A1 | 2/2010 | Roth |
| 2010/0058226 A1 | 3/2010 | Flake et al. |
| 2010/0060586 A1 | 3/2010 | Pisula et al. |
| 2010/0066698 A1 | 3/2010 | Seo |

(56) References Cited

U.S. PATENT DOCUMENTS

| | | |
|---|---|---|
| 2010/0079392 A1 | 4/2010 | Chiang et al. |
| 2010/0095224 A1 | 4/2010 | Yozell-Epstein et al. |
| 2010/0095239 A1 | 4/2010 | McCommons et al. |
| 2010/0107067 A1 | 4/2010 | Vaisanen et al. |
| 2010/0153951 A1 | 6/2010 | Jones |
| 2010/0156656 A1 | 6/2010 | Duarte et al. |
| 2010/0162180 A1 | 6/2010 | Dunnam et al. |
| 2010/0169722 A1 | 7/2010 | Wu et al. |
| 2010/0171753 A1 | 7/2010 | Kwon |
| 2010/0175018 A1 | 7/2010 | Petschnigg et al. |
| 2010/0182248 A1 | 7/2010 | Chun |
| 2010/0185989 A1 | 7/2010 | Shiplacoff et al. |
| 2010/0214234 A1 | 8/2010 | Singhal |
| 2010/0214237 A1 | 8/2010 | Echeverri et al. |
| 2010/0218130 A1 | 8/2010 | Conrad et al. |
| 2010/0231533 A1 | 9/2010 | Chaudhri |
| 2010/0235794 A1 | 9/2010 | Ording |
| 2010/0248689 A1 | 9/2010 | Teng et al. |
| 2010/0251178 A1 | 9/2010 | Lee et al. |
| 2010/0289760 A1 | 11/2010 | Jonoshita et al. |
| 2010/0295772 A1 | 11/2010 | Alameh et al. |
| 2010/0302172 A1 | 12/2010 | Wilairat |
| 2010/0306693 A1 | 12/2010 | Brinda |
| 2010/0306705 A1 | 12/2010 | Nilsson |
| 2010/0317408 A1 | 12/2010 | Ferren et al. |
| 2011/0029927 A1 | 2/2011 | Lietzke et al. |
| 2011/0034208 A1 | 2/2011 | Gu et al. |
| 2011/0061021 A1 | 3/2011 | Kang et al. |
| 2011/0083111 A1 | 4/2011 | Forutanpour et al. |
| 2011/0099490 A1 | 4/2011 | Barraclough et al. |
| 2011/0112771 A1 | 5/2011 | French |
| 2011/0163944 A1 | 7/2011 | Bilbrey et al. |
| 2011/0163970 A1 | 7/2011 | Lemay |
| 2011/0163989 A1 | 7/2011 | Singhal |
| 2011/0167369 A1 | 7/2011 | van Os |
| 2011/0175748 A1* | 7/2011 | Small et al. ............... 340/815.55 |
| 2011/0175839 A1 | 7/2011 | Prabhu |
| 2011/0181526 A1 | 7/2011 | Shaffer et al. |
| 2011/0185318 A1 | 7/2011 | Hinckley et al. |
| 2011/0209088 A1 | 8/2011 | Hinckley et al. |
| 2011/0209097 A1 | 8/2011 | Hinckley et al. |
| 2011/0209104 A1 | 8/2011 | Hinckley et al. |
| 2011/0210983 A1 | 9/2011 | Theimer et al. |
| 2011/0231499 A1 | 9/2011 | Stovicek et al. |
| 2011/0252369 A1* | 10/2011 | Chaudhri ..................... 715/830 |
| 2011/0252381 A1 | 10/2011 | Chaudhri |
| 2011/0256848 A1 | 10/2011 | Bok et al. |
| 2011/0294467 A1 | 12/2011 | Kim et al. |
| 2012/0013552 A1 | 1/2012 | Ahn |
| 2012/0026194 A1 | 2/2012 | Wagner et al. |
| 2012/0032979 A1 | 2/2012 | Blow et al. |
| 2012/0083260 A1 | 4/2012 | Arriola et al. |
| 2012/0084697 A1 | 4/2012 | Reeves |
| 2012/0084698 A1 | 4/2012 | Sirpal et al. |
| 2012/0090004 A1 | 4/2012 | Jeong |
| 2012/0102437 A1 | 4/2012 | Worley et al. |
| 2012/0105358 A1 | 5/2012 | Momeyer et al. |
| 2012/0110087 A1 | 5/2012 | Culver et al. |
| 2012/0115449 A1 | 5/2012 | Bruchelt |
| 2012/0154303 A1 | 6/2012 | Lazaridis et al. |
| 2012/0159380 A1 | 6/2012 | Kocienda et al. |
| 2012/0173993 A1 | 7/2012 | Chakra et al. |
| 2012/0180001 A1 | 7/2012 | Griffin et al. |
| 2012/0192108 A1 | 7/2012 | Kolb |
| 2012/0206392 A1 | 8/2012 | Ng et al. |
| 2012/0210214 A1 | 8/2012 | Yoo et al. |
| 2012/0218192 A1 | 8/2012 | Lazaridis et al. |
| 2012/0226978 A1 | 9/2012 | Harberts et al. |
| 2012/0235930 A1 | 9/2012 | Lazaridis et al. |
| 2012/0236037 A1 | 9/2012 | Lessing et al. |
| 2012/0266082 A1 | 10/2012 | Webber |
| 2012/0280917 A1 | 11/2012 | Toksvig et al. |
| 2012/0284673 A1 | 11/2012 | Lamb et al. |
| 2012/0290946 A1 | 11/2012 | Schrock et al. |
| 2012/0304107 A1 | 11/2012 | Nan et al. |
| 2012/0304108 A1 | 11/2012 | Jarrett |
| 2012/0311444 A1 | 12/2012 | Chaudhri |
| 2012/0326984 A1 | 12/2012 | Ghassabian |
| 2013/0002524 A1 | 1/2013 | Sirpal et al. |
| 2013/0007665 A1 | 1/2013 | Chaudhri et al. |
| 2013/0024820 A1* | 1/2013 | Kirkpatrick ................... 715/863 |
| 2013/0031515 A1 | 1/2013 | Funabashi et al. |
| 2013/0033477 A1 | 2/2013 | Sirpal et al. |
| 2013/0063383 A1 | 3/2013 | Anderssonreimer et al. |
| 2013/0083260 A1 | 4/2013 | Minami |
| 2013/0117689 A1 | 5/2013 | Lessing et al. |
| 2013/0117718 A1 | 5/2013 | Lazaridis et al. |
| 2013/0141371 A1 | 6/2013 | Hallford et al. |
| 2013/0159941 A1 | 6/2013 | Langlois et al. |
| 2013/0167066 A1 | 6/2013 | Scott |
| 2013/0185650 A1 | 7/2013 | Gutowitz |
| 2013/0187863 A1 | 7/2013 | Rydenhag et al. |
| 2013/0187869 A1 | 7/2013 | Rydenhag et al. |
| 2013/0191791 A1 | 7/2013 | Rydenhag et al. |
| 2013/0321340 A1 | 12/2013 | Seo et al. |
| 2013/0326401 A1 | 12/2013 | van Os |
| 2013/0326583 A1 | 12/2013 | Freihold et al. |
| 2013/0332886 A1 | 12/2013 | Cranfill et al. |
| 2013/0346906 A1 | 12/2013 | Farago |
| 2014/0011485 A1 | 1/2014 | Forstall et al. |
| 2014/0109020 A1 | 4/2014 | Wielgosz |
| 2014/0111440 A1 | 4/2014 | Garside et al. |

FOREIGN PATENT DOCUMENTS

| | | | |
|---|---|---|---|
| EP | 2045700 | A1 | 4/2009 |
| EP | 2068236 | A1 | 6/2009 |
| EP | 2109030 | A2 | 10/2009 |
| EP | 2383636 | A1 | 11/2011 |
| EP | 2458493 | A3 | 5/2012 |
| EP | 2485138 | A1 | 8/2012 |
| KR | 10-2008-0041809 | A1 | 5/2008 |
| KR | 20090036578 | | 4/2009 |
| KR | 20100023637 | | 3/2010 |
| KR | 20100032660 | | 3/2010 |
| TW | 201118666 | | 6/2011 |
| WO | 2004051451 | A3 | 6/2004 |
| WO | 2009097555 | A2 | 8/2009 |
| WO | 2009120925 | A2 | 10/2009 |
| WO | 2010040670 | A2 | 4/2010 |
| WO | 2012097385 | A2 | 7/2012 |
| WO | 2012128795 | A1 | 9/2012 |

OTHER PUBLICATIONS http://www.jimblackler.net/blog/?p=67/ "QuickCalendar, an application for Android written in Java" Retrieved Oct. 18, 2012, 6 pages.
http://www.support.apple.com/kb/HT3756/ "iOS: Understanding Notifications" Retrieved Oct. 18, 2012, 3 pages.
Android Users Guide 2.3 (Google, Inc.) Dec. 13, 2010, see pp. 29-30, pp. 380. (English).
Android Users Guide 2.3 (Google, Inc.) Dec. 13, 2010, see pp. 27-28, pp. 368. (Korean).
International Search Report and Written Opinion issued in corresponding application PCT/US2012/050593, dated Mar. 4, 2013, 12 pages.
http://www.evernote.com/peek/ Retrieved Aug. 27, 2012, 2 pages.
http://www.gigaom.com/2011/10/12/ios-5-notifications-and-notification-center/, Retrieved May 2, 2013, Asch, Josh, "iOS 5: Notifications and Notification Center", Tech News and Analysis, Oct. 12, 2011, four pages.
Microsoft, "Cross Sliding State enumeration", internet article, http://msdn.microsoft.com.en-us/library/windows/apps/windows.ui.inout.crosslidingstate, retrieved Sep. 4, 2012, 3 pages.
Levesque et al., Frictional Widgets: Enhancing Touch Interfaces with Programmable Friction, published CHI 2011, ACM 978-1-4503-0268-5/11/05, May 7-12, 2011, 6 pages.
International Bureau, "International Preliminary Report on Patentability," issued in connection with International patent application No. PCT/US2012/050593 on Jun. 3, 2014, 8 pages.

* cited by examiner

ELECTRONIC DEVICE AND METHOD OF PROVIDING VISUAL NOTIFICATION OF A RECEIVED COMMUNICATION

CROSS REFERENCE TO RELATED APPLICATIONS

This patent application is a continuation-in-part of and claims priority to U.S. patent application Ser. No. 13/036,186, filed on Feb. 28, 2011, titled "ELECTRONIC DEVICE AND METHOD OF DISPLAYING INFORMATION IN RESPONSE TO INPUT," and is a continuation-in-part of and claims priority to U.S. patent application Ser. No. 13/309,227, filed on Dec. 1, 2011, titled "ELECTRONIC DEVICE AND METHOD OF DISPLAYING INFORMATION IN RESPONSE TO A GESTURE," and is a continuation-in-part of and claims priority to U.S. patent application Ser. No. 13/405,193, filed on Feb. 24, 2012, titled "ELECTRONIC DEVICE AND METHOD OF DISPLAYING INFORMATION IN RESPONSE TO A GESTURE," the contents of which applications are incorporated herein by reference in their entirety. U.S. patent application Ser. No. 13/309,227 is a continuation-in-part of and claims priority to U.S. patent application Ser. No. 13/036,186, filed on Feb. 28, 2011, titled "ELECTRONIC DEVICE AND METHOD OF DISPLAYING INFORMATION IN RESPONSE TO INPUT." U.S. patent application Ser. No. 13/309,227 is a continuation-in-part of and claims priority to U.S. patent application Ser. No. 12/985,600, filed on Jan. 6, 2011, titled "ELECTRONIC DEVICE AND METHOD OF CONTROLLING SAME."

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities (short range wireless technology).

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified based on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
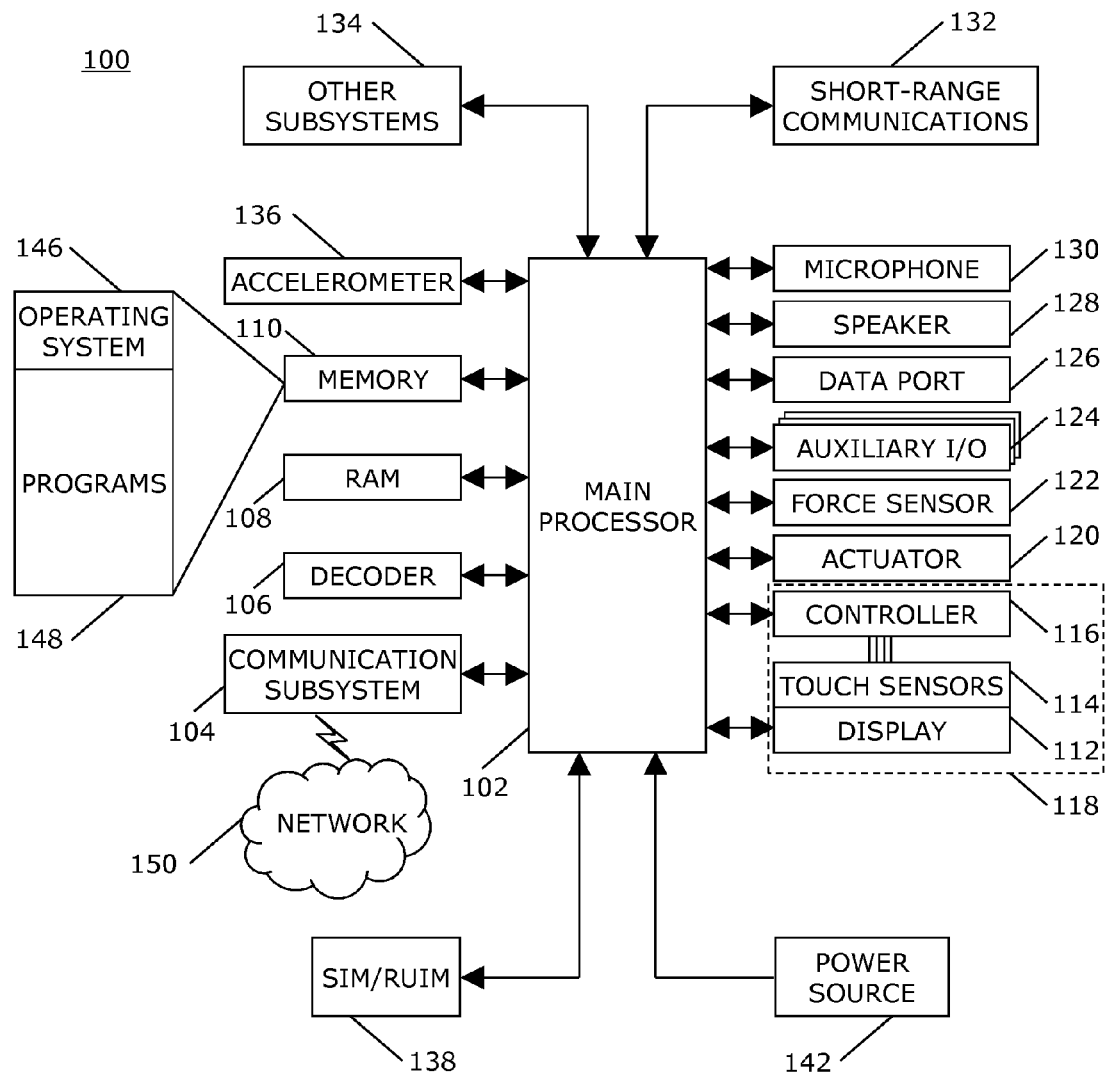
FIG. 1 is a block diagram of an electronic device such as a portable electronic device in accordance with the disclosure.

The following describes an apparatus for and method of controlling display of information for two applications or images. A gesture detected during display of information associated with a first application or image requests display of information associated with a second application or image. The information associated with the second application or image may be previewed without opening or launching the second application. Optionally, the application may be opened. A single continuous gesture may control the amount of the second application or image information that is displayed, as well as optionally opening the second application.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, pen, or other pointer, based on the nature of the touch-sensitive display 118. Multiple simultaneous touches may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time. The gesture may be a two dimensional gesture, such as a gesture detected by a touch-sensitive input device, e.g., a touch-sensitive display, a trackpad, and optical joystick, a trackball, and so forth. The gesture may be a three-dimensional gesture, which may be detected by one or more of a camera, a proximity sensor, an optical sensor, and so forth.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
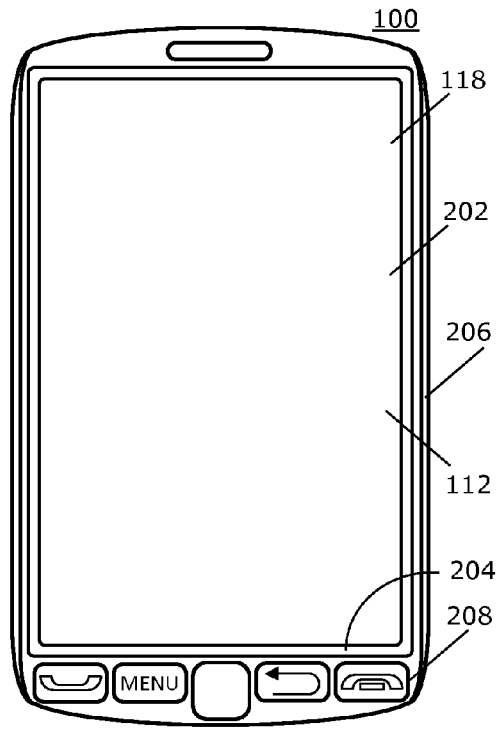
FIG. 2 is a front view of a portable electronic device in accordance with the disclosure.

A front view of a portable electronic device is shown in FIG. 2. The touch-sensitive display 118 includes a display area 202 in which information may be displayed, and a non-display area 204 extending around the periphery of the display area. The display area 202 generally corresponds to the area of the display 112. Information is not displayed in the non-display area 204 by the display 112, which non-display area 204 is utilized to accommodate, for example, electronic traces or electrical connections, adhesives or other sealants, and/or protective coatings around the edges of the display area. The non-display area 204 may be referred to as an inactive area. The non-display area 204 is typically not part of the physical housing or frame 206 of the electronic device. Typically, no pixels of the display 112 are in the non-display area 204, thus no image can be displayed by the display 112 in the non-display area 204. Optionally, a secondary display, not part of the primary display 112, may be disposed under the non-display area 204. Touch sensors may be disposed in the non-display area 204, which touch sensors may be extended from the touch sensors in the display area or distinct or separate touch sensors from the touch sensors in the display area 202. A touch, including a gesture, may be associated with the display area 202, the non-display area 204, or both areas. The touch sensors may extend across substantially the entire non-display area 204 or may be disposed in only part of the non-display area 204. Touches may be detected, for example, starting in the non-display area 204 and continuing into the display area 202 or starting in the display area 202 and continuing into the non-display area 204, whether or not touch sensors are disposed in the non-display area 204. The portable electronic device 100 optionally includes a set of convenience keys or buttons 208, 1308 that may be separate physical keys or buttons or virtual keys or buttons.

A sequence of responses to various aspects of a gesture is shown in FIG. 3 through FIG. 10. Previewing second application information with an option to open the second application is described. The electronic device 100 is in a portrait orientation in these examples, although the examples apply to a landscape orientation as well. In this example, a weather application is displayed when a notification occurs. The notification may indicate, for example, an incoming message, such as an email or text message, a missed phone call, a meeting notice, a social networking message, and so forth. The notification may be audible and/or visual. A visual notification may be provided by a separate physical element, e.g., a light emitting diode that blinks, or a displayed notification, such as the virtual notifier 302 that appears as a blinking object on the touch-sensitive display. The notification may be provided for a predetermined period of time or until an action terminates the notification. The notification may optionally activate monitoring for a gesture that indicates a request to display information associated with a second application for which information is not currently being displayed. For example, the monitoring may target detection of a touch at specific locations of the display, such as at or near an edge or side of the display area 202.

Figure 4:
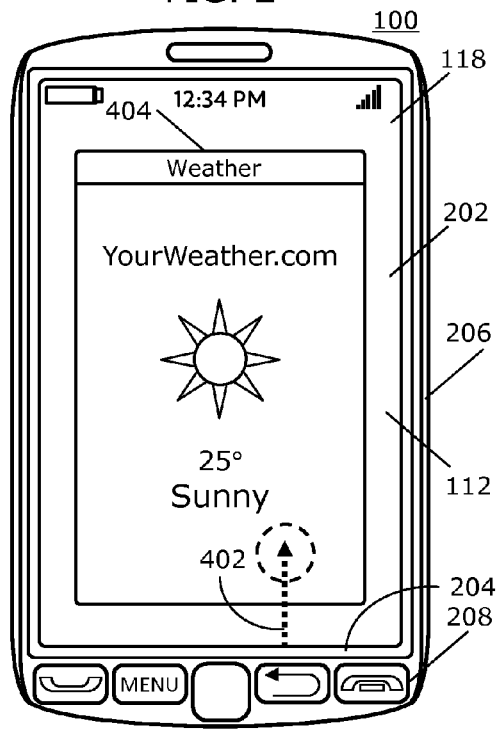

During display of information associated with a first application, the weather application in this example, a gesture is detected. The gesture in this example has an origin associated with a lower edge of the display area 202, e.g., a swipe that starts in the non-display area 204 and continues onto the display area 202 as shown in FIG. 4. Throughout the drawings, a current location of the gesture is shown by a dotted circle, and a path of the gesture is shown by a dotted line with an arrow indicating most recent direction (if any) of the gesture. Information associated with the first application is referred to as first application information, and information associated with the second application is referred to as second application information herein. In this example, the path 402 of the gesture is indicated by the dotted line and arrow. The gesture need not be provided in response to the notification and may be detected at any time.

Figure 5:
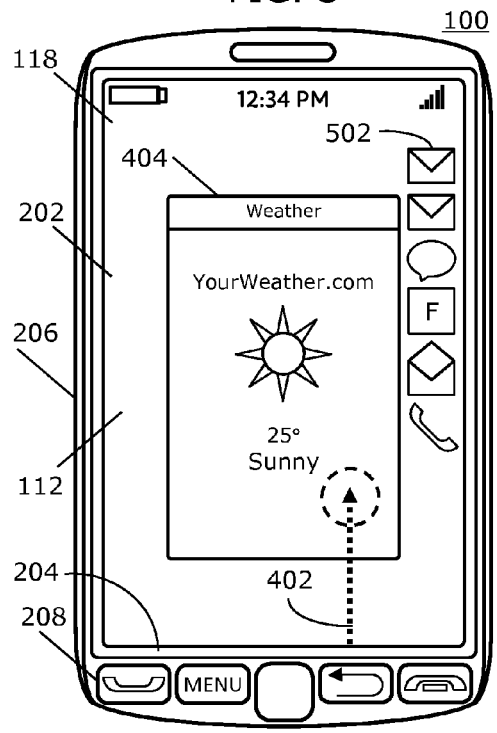

The first application information 404 may optionally be displayed in a background manner, such as in a reduced or gradually reduced size (such as shown in FIG. 4 through FIG. 9, FIG. 14 through FIG. 17, FIG. 19, and FIG. 20), in a partially or gradually transparent style, in a manner that covers or replaces the first application information with the second application information (such as shown in FIG. 7, FIG. 8, FIG. 10, and FIG. 20), in a manner that shifts or scrolls the first application information off the touch-sensitive display 118 (such as shown in FIG. 11, FIG. 15 through FIG. 17, FIG. 19, and FIG. 20) other visual representations, or any combination thereof. The gradual changes in display may optionally take place in response to movement of the gesture or display of the second application information. For example, FIG. 4 and FIG. 5 illustrate that the first application information is reduced in size more as the path 402 of the gesture extends further into the display area 202.

Optionally, additional information may be displayed with the first application information 404 when this information is displayed in a reduced size. For example, a battery level, time, date, signal strength, and one or more message notifications 502 may be displayed, such as shown in FIG. 5. The user may be satisfied with the additional information displayed, and may discontinue the gesture, thus returning the display to displaying the first application information.

Figure 6:
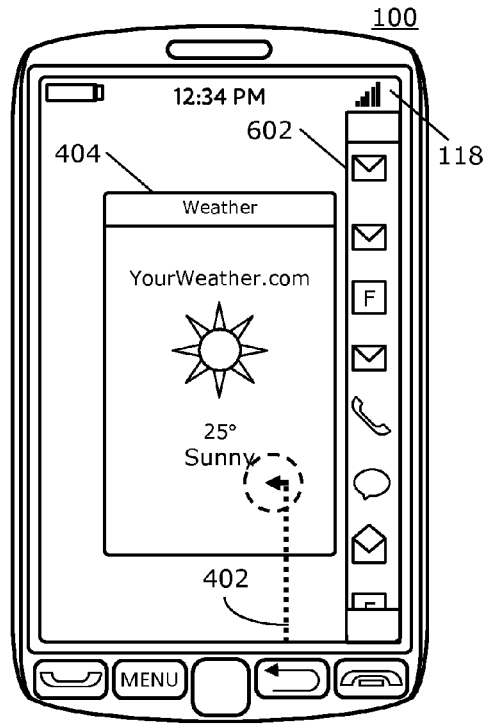
Figure 7:
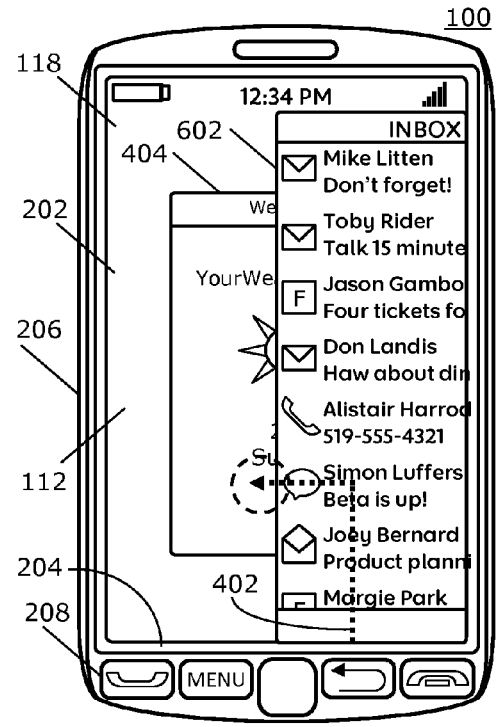
Figure 8:
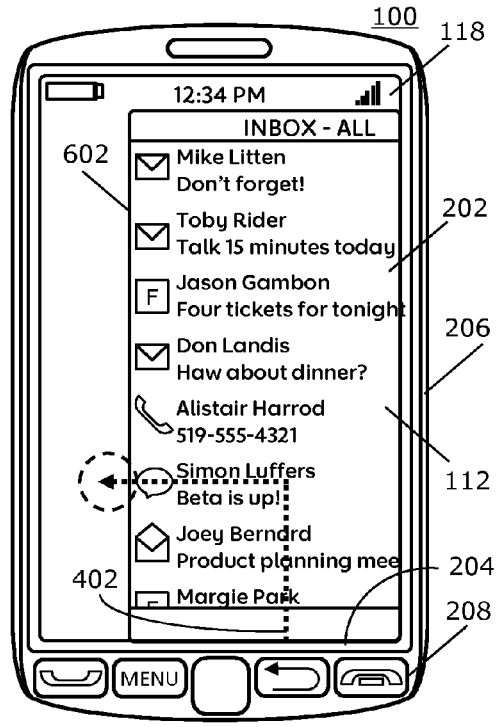

As the gesture continues in the example sequence, the path 402 of the gesture changes direction in FIG. 6, which change in direction triggers the beginning of the display of the second application information 602. In this example sequence, the second application information 602 shifts or scrolls onto the touch-sensitive display 118 from a right side or edge of the display 118 relative to the orientation of the drawing. Thus, the second application information 602 shifts or scrolls onto the display 118 from a side or edge of the display 118 different from the edge associated with the gesture, e.g., where the gesture originated.

Optionally, the second application information 602 is gradually shifted or scrolled onto or off (of) the display 118 along with the movement of the gesture. As the path 402 of the gesture moves to the left as the example proceeds from FIG. 6 to FIG. 7 to FIG. 8, more of the second application information 602 is gradually displayed. This shifting or scrolling provides a user with the ability to view a part of the second information 602 until the user has seen enough information to decide whether or not to open the second application. The second application information 602 may optionally be displayed more quickly when the gesture moves more quickly. More of the second application information 602 may optionally be displayed as length of the gesture increases, such as shown in the example in the progression of the gesture from FIG. 6 to FIG. 7 to FIG. 8. Thus, the amount of information displayed may optionally be proportional to the length of the path of the gesture or the length of a part of the path of the gesture. More of the second application information 602 may optionally be displayed the longer the gesture is maintained or detected by the touch-sensitive display. Thus, the amount of information displayed may optionally be proportional to the duration or length of time of detection of the gesture.

Figure 9:
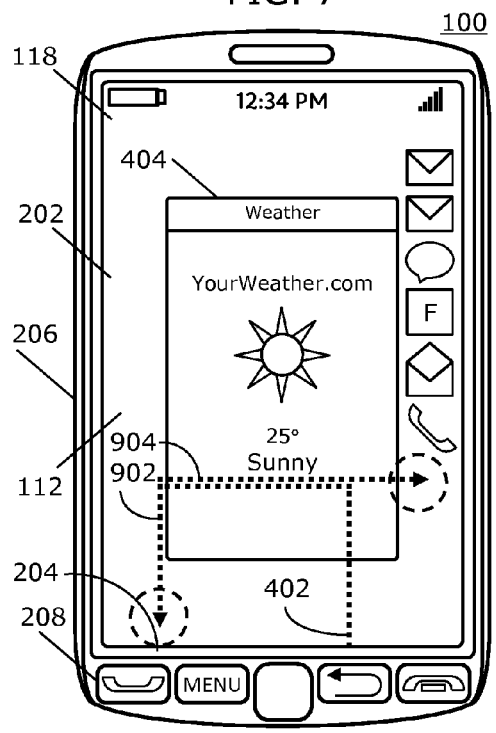

The user is provided with the ability to preview the second application information without opening the application and to optionally open the second application if desired. FIG. 9 illustrates a few different examples of gesture characteristics that terminate the preview of the second application information. For example, the user may have viewed enough information via preview and does not desire to view more information or open the second application. One gesture option to terminate preview includes changing the path 902 of the gesture in a direction toward the edge or side associated with the origin of the gesture, which is the bottom of the display area 202 in this example. Another gesture option to terminate preview includes changing the path 904 of the gesture in a direction toward the edge or side where the second application information began to be displayed, such as the edge where the information shifts or scrolls onto the display area 202. Another gesture option to terminate preview includes simply discontinuing the gesture, e.g., the input member is removed from the touch-sensitive display 118.

Figure 3:
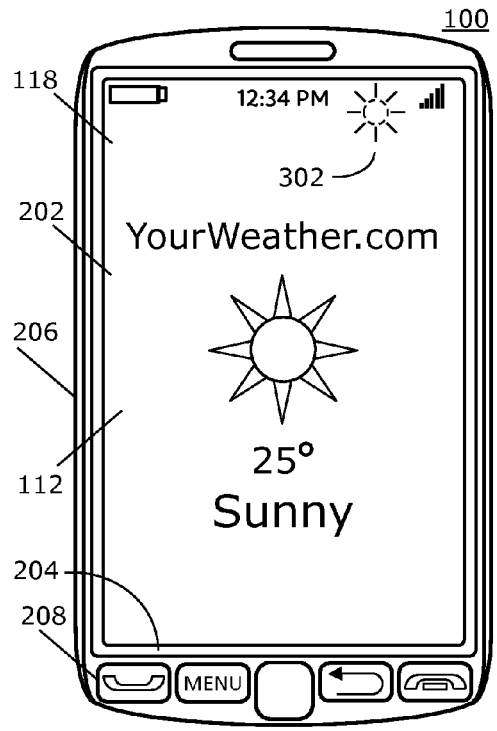
FIG. 3 through FIG. 11 illustrate examples of previewing information on a portable electronic device in accordance with the disclosure.

When the gesture ceases, optionally, the first application information is again displayed on the display 118, as shown in the example of FIG. 9. With this option, the first application information 404 may be displayed in a gradually increasing size, may shift or scroll back onto the display area 202, or may be immediately restored to full or normal display size, such as shown in FIG. 3.

Figure 10:
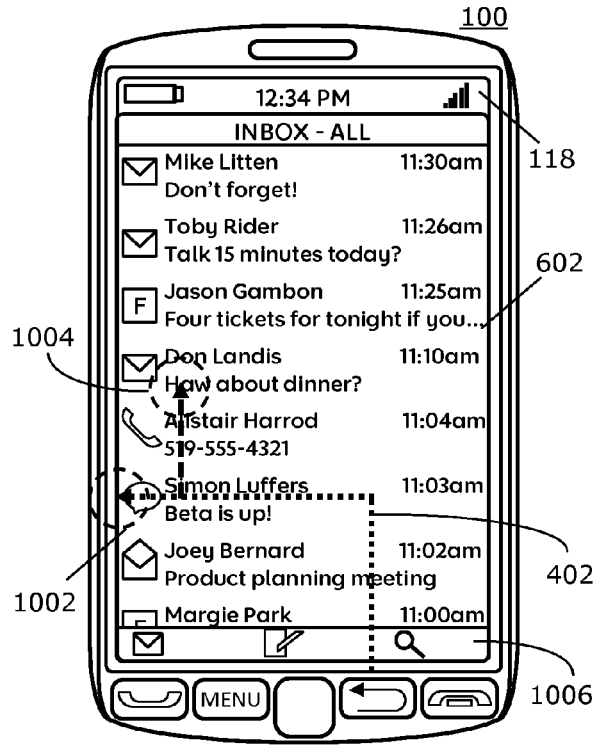

Upon previewing the second application information 602, the user may desire to open the second application, for example, to open or send a message. The second application may be opened when the gesture includes a characteristic that indicates opening of the second application. For example, the path 402 of the gesture may continue from FIG. 8 along the optional paths 1002, 1004 shown in FIG. 10 to open the second application. The paths 1002, 1004 reflect examples of characteristics or attributes of the gesture that are interpreted by the device 100 to open the second application. One option for the gesture to open the second application is for the path 1002 of the gesture to continue in its current direction until the gesture is associated with another edge or side of the display, such as the edge or side opposite the edge or side where the display of the second application information 602 entered the display, such as shown in FIG. 10. Another option for the gesture to open the second application is for the path 1004 of the gesture to change direction, such as toward the edge or side opposite the edge or side where the display of the second application information 602 entered the display, such as shown in FIG. 10. Another option is to automatically open the second application when the second application information covers available display area in response to the gesture, for example, when the second application information is displayed across a vertical or horizontal extent of the display area 202 or a vertical or horizontal extent of a window, frame, or field in which the second application information is displayed. A tool bar 1006 may optionally be displayed.

Figure 11:
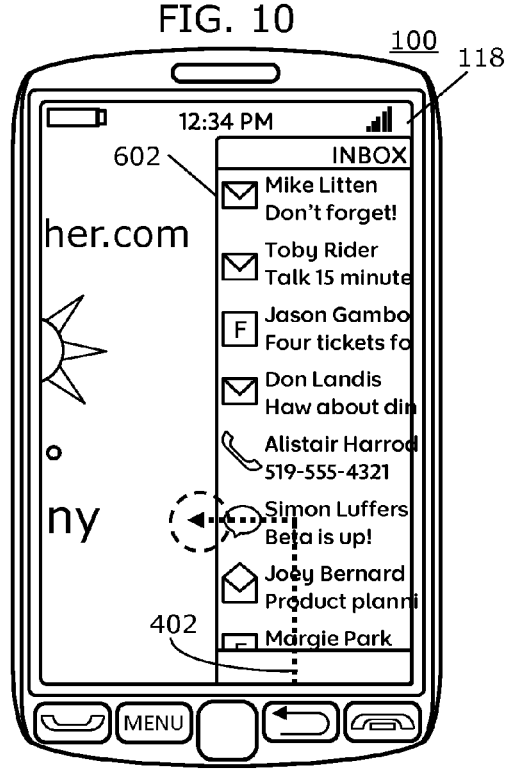

Some of the examples herein show an option where the first application information is displayed in a reduced size. Another option in these examples retains the reduced-size first application information at a fixed location on the display 118 as the second application information covers or replaces the first application information on the display 118. Optionally, the first application information may be displayed without changing the size of the information, i.e., in the same size, such as shown in FIG. 11. When the first application information is displayed same-size, the first application information may be retained at a fixed location on the display 118 as the second application information covers or replaces the first application information on the display 118, or the first application information may be shifted or scrolled off the display 118 as the second application information is shifted or scrolled on the display 118, such as shown in FIG. 11. Less first application information, e.g., quantity of information or area of display covered by the information, may be displayed as more second application information is displayed.

Figure 12:
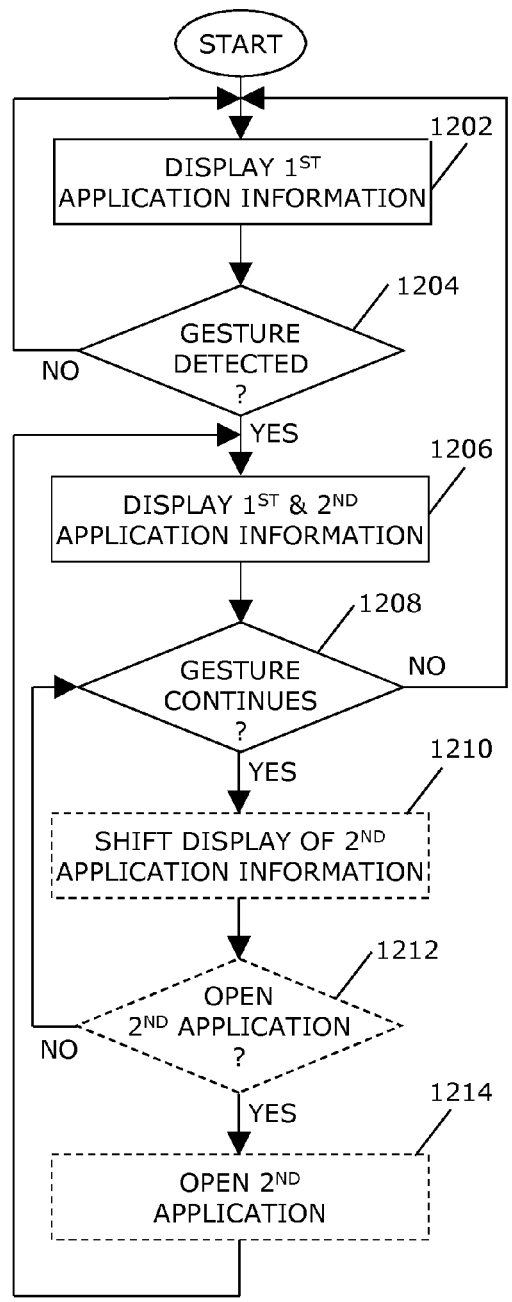
FIG. 12, FIG. 22, and FIG. 35 are flowcharts illustrating a method of controlling display of information in accordance with the disclosure.

A flowchart illustrating a method of controlling display of information for two applications is shown in FIG. 12. The method may be carried out by software executed, for example, by the processor 102 of the electronic device, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, device, or apparatus, such as a non-transitory computer-readable medium.

Information associated with a first application is displayed 1202 on a display, for example, on a touch-sensitive display 118. The image or information may includes information associated with any suitable application or aspect or element of an application, such as email (also referred to as electronic mail), text messaging, calendar, tasks, address book or contacts, media player, home page, icon (including active icons) or widget display page, universal inbox (also referred to as a mailbox), or any other suitable application in or for which information is displayed by or on an electronic device 100. Information associated with email may include a list of email messages, information associated with a calendar may include a meeting schedule, calendar day view, week view, month view, or agenda view, information associated with an address book may include a listing of contacts, information associated with a media player may include text, pictures, videos, or artwork related to music or other media. The applications and information are not limited to the examples provided.

A gesture that indicates a request to display information associated with a second application is detected 1204. Detection of the gesture triggers display of the second application information. The gesture may be considered to be a command associated with the second application, which command requests, controls, or causes at least part of the second application information to be displayed.

An appropriate gesture is advantageously assigned to request display of information associated with a second application. Advantageously, unintentional display of information is avoided. Thus, the gesture is associated with the second application. The gesture may be associated with a specific location, such as an edge (or side) or corner of the touch-sensitive display 118, or a displayed item or element, such as a special indicator, e.g., a ghosted symbol or word, or a header for an application. The gesture may have detectable attributes or characteristics, such as movement, direction, change in direction, shape, duration, length, force, speed, time associated with a given location as with a hover, number of simultaneous touch locations, number of taps, use in conjunction with a physical key, button, or other input device, and so forth. The gesture may comprise depression of a touch-sensitive display 118 that actuates an actuator 120, such as described above. The gesture may comprise any combination of the above characteristics or attributes.

Figure 20:
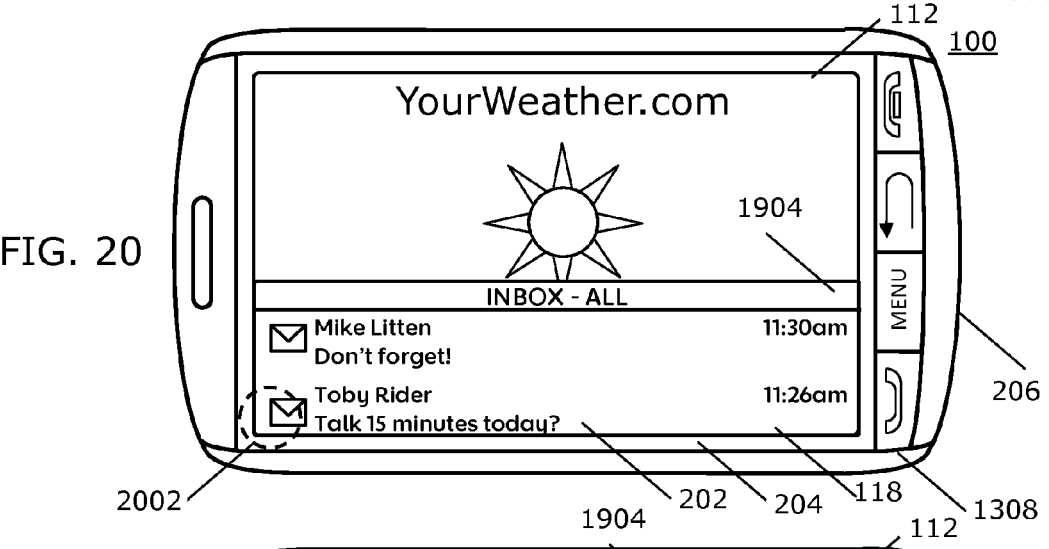
Figure 21:
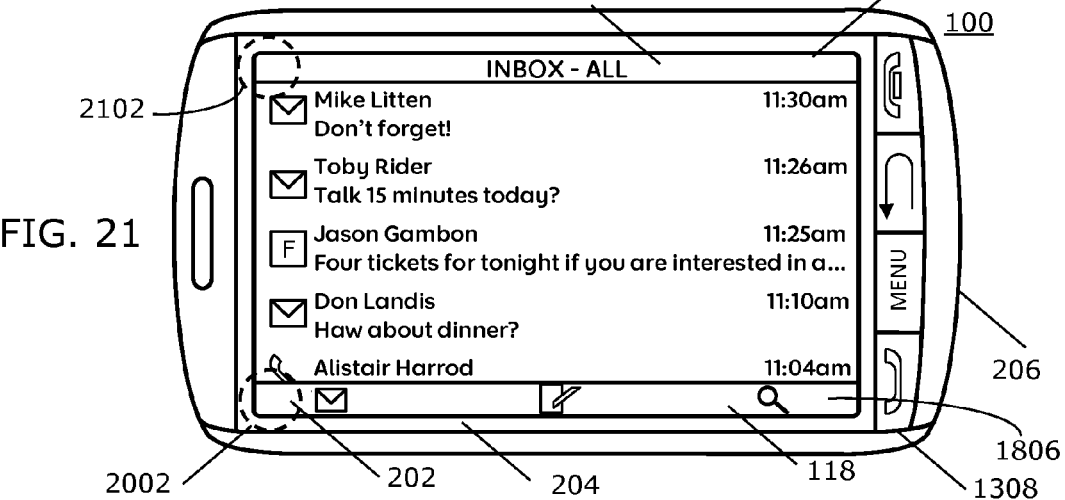

A few examples of a gesture are as follows. The gesture may be associated with an edge or side of the display area 202 and extends into or enters the display area 202. A gesture associated with an edge or side of the display area 202 may be, for example, a gesture detected by touch sensors in the non-display area 204, a gesture that starts outside the display area 202 and continues onto the display area, a gesture having a touch location (e.g., an origin of the gesture) that is at or near an outer perimeter of the display area 202, and so forth. A corner of the display area 202 may be associated with one or both edges or sides that meet at the corner. The gesture may be a hover or other gesture that remains associated with a specific location for a period of time, such as the sustained touch at a location 2002 associated with a corner of the touch-sensitive display 118 as shown in the example of FIGS. 20 and 21 or a displayed image such as the icon 2704 in FIG. 27. The input may be a compound gesture, for example, a touch sustained at a specific location, such as a corner or side of the display, while a swipe is detected. The gesture may be input directly via an input device, e.g., a touch-sensitive display, optical joystick, and so forth, and may include other types of gestures such as 3D gestures or physical gestures involving movement of the electronic device 100. The gesture need not be associated with an edge or side.

The second application may be any suitable application, such as described above. The second application information is also described above. For example, the second application may be a message application, and the second application information that is displayed is the inbox for the messaging application. The inbox may be a universal inbox, which may include any or all of the following, for example, emails, meeting notifications, text messages of any type, missed phone call notifications, social networking messages, system messages, news feed messages, download progress messages, subscribed information messages, and so forth. The second application may alternatively be a calendar, an address book, home screen, and so forth. The second application may alternatively be a notification application that manages notifications of various sorts, including notifications related to email, text, missed phone calls, calendar, social networking, and device warnings, such as low battery or lost communication connection, to name a few.

The first application information and second application information are displayed 1206. For example, the second application information may be displayed in increasing quantity as the first application information is displayed in decreasing quantity. The displayed second application information may be a preview (or peek) of the second application information, including, for example, a subset or part of all the available second application information. For example, when the second application is an email application, the last five emails may be displayed, when the second application is an address book, the ten most often accessed contacts may be displayed, and so forth. The preview may be displayed without opening or launching the second application, in which case the previewed information may be retrieved from stored information and/or information received via a communication network 150. Previewing or displaying without opening the second application is typically a faster process than opening the second application.

While previewed, second application information is viewable and active application functions are not operable other than to display more or less of the information. For the example of previewing a messaging inbox, email messages cannot be opened and new emails cannot be initiated during a preview, although the titles, senders, and time information are viewable. For the example of previewing a calendar, existing calendar events cannot be opened and new calendar events cannot be initiated during a preview, although the titles, meeting initiator, and time information are viewable. The second application may optionally be opened to engage active application functions. The preview of the second application information is displayed, for example, for the time duration of the gesture or until the second application is opened or activated.

While the gesture continues 1208, the second application information may optionally be displayed by shifting or scrolling 1210 the information onto or off (of) the touch-sensitive display 118. The shifting optionally occurs in accordance with movement of the gesture. For example, more information may be displayed as the gesture moves in a forward direction and less information may be displayed as the gesture moves in a reverse direction. A forward direction may be, for example, the direction that the information takes as it progresses onto the display 118, and the reverse direction is the opposite direction to the forward direction. The shifting or scrolling of the second application information may continue as long as the gesture continues or until the second application is opened 1214 in response to detecting 1212 an indication to open the second application. The first application information may optionally shift or scroll off the display 118 as the second application information scrolls onto the display 118. Similarly, the first application information may optionally shift or scroll onto the display 118 as the second application information scrolls off the display 118. Thus, the method provides a preview of second application information without opening the second application while providing an easily executed option to open the second application.

A sequence of responses to various aspects of gestures is shown in FIG. 13 through FIG. 21. Previewing second application information with an option to open the second application are described. Descriptions of features and aspects described above will not be repeated for the sake of brevity. The electronic device 100 is in a landscape orientation in these examples, although the examples apply to a portrait orientation as well. The portable electronic device 100 in FIG. 13 through FIG. 21 has a different form factor than the form factor of the portable electronic device 100 of FIG. 2 through FIG. 11. The method described herein applies any form factor.

Figure 13:
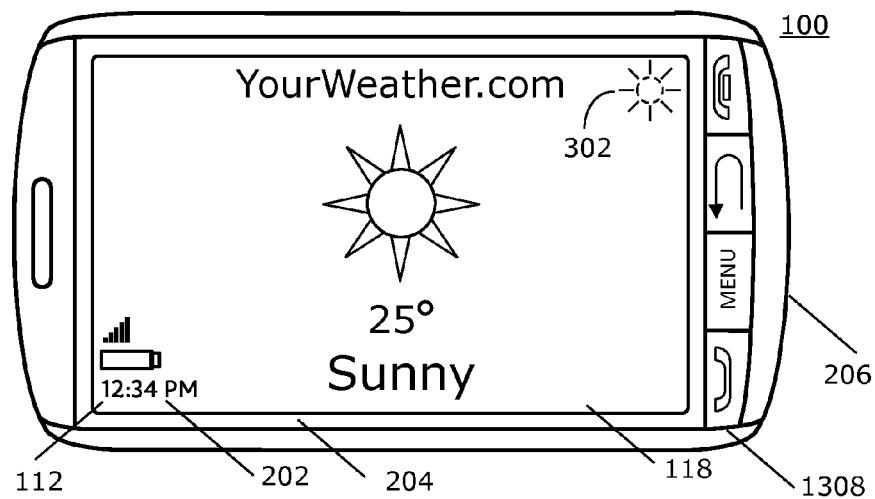
FIG. 13 through FIG. 21 and FIG. 23 through FIG. 34 illustrate examples of previewing information on an electronic device in accordance with the disclosure.
Figure 14:
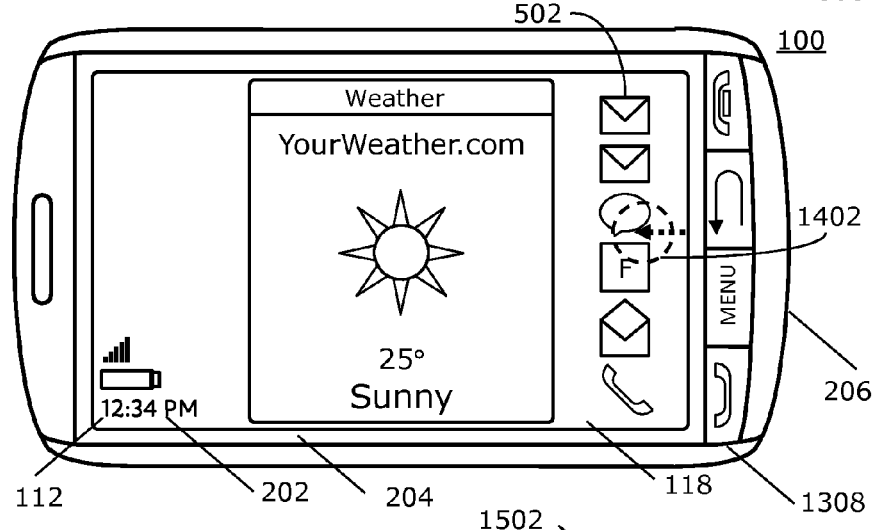

The first application in this example is the same weather application from the above examples, although the information is displayed in a landscape orientation, as shown in FIG. 13. A notification, such as described above, may optionally be provided, such as the virtual notifier 302. The gesture that indicates a request to display information associated with a second application is detected. The gesture in this example has an origin associated with a right edge or side of the display area 202, e.g., a swipe that has a path 1402 that starts in the non-display area 204 and continues onto the display area 202 toward the left as shown in FIG. 14. The gesture need not be provided in response to the notification and may be detected at any time.

Figure 15:
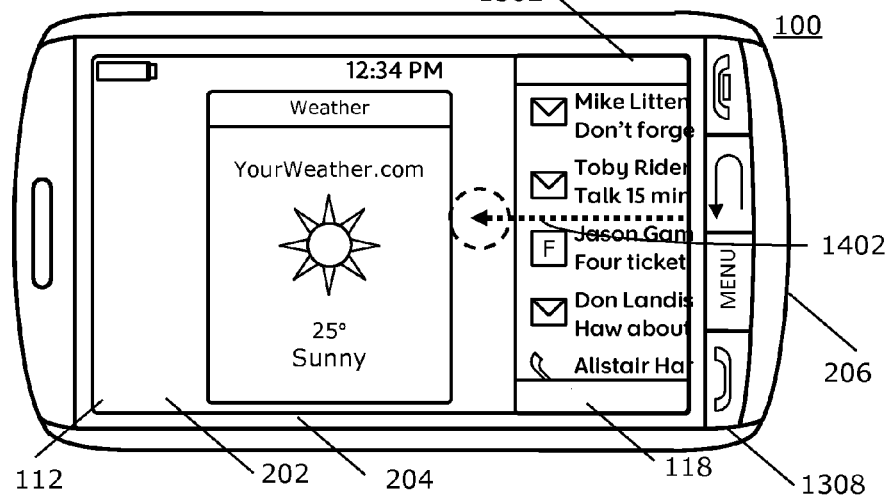

As shown in FIG. 15, the second application information 1502 shifts or scrolls onto the display 118 beginning at the right side or edge of the display 118 when the gesture is detected, which may include a slight delay. In this example, the second application information 1502 scrolls or shifts onto the display 118 from the same edge or side associated with the gesture.

Figure 16:
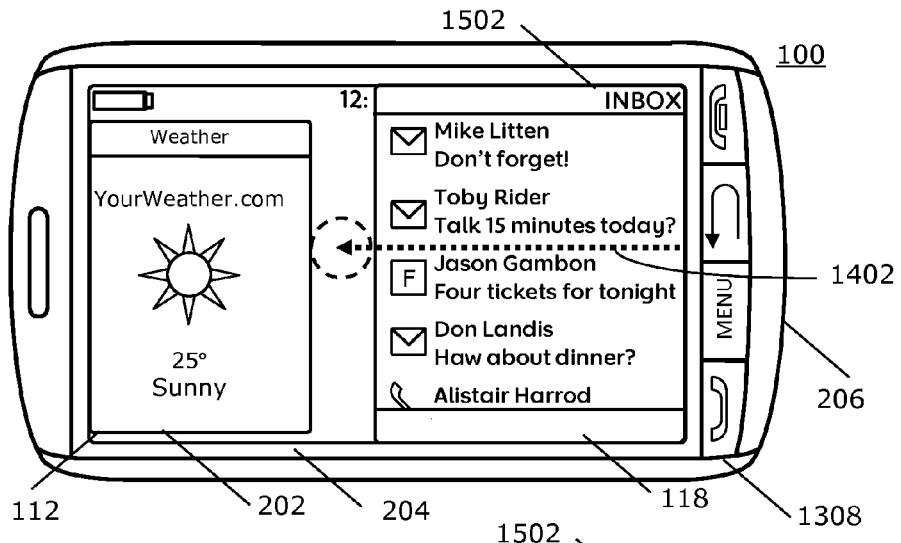
Figure 17:
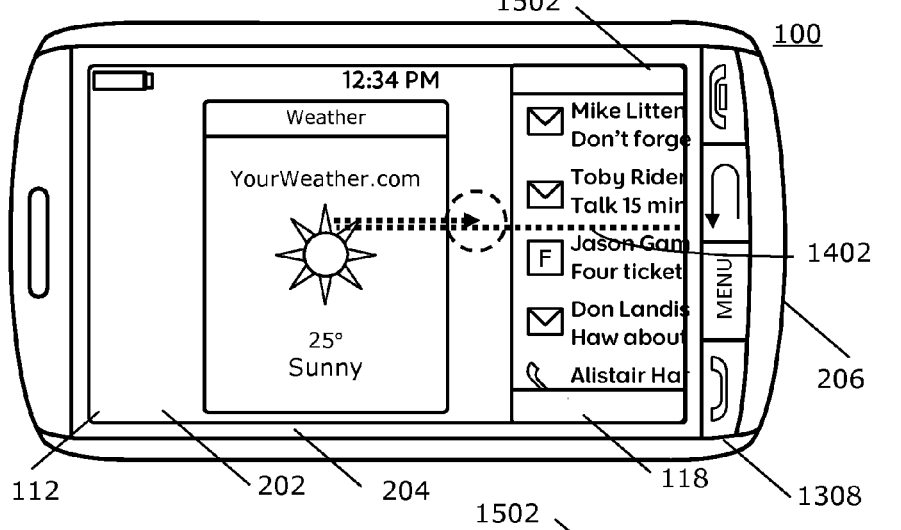
Figure 19:
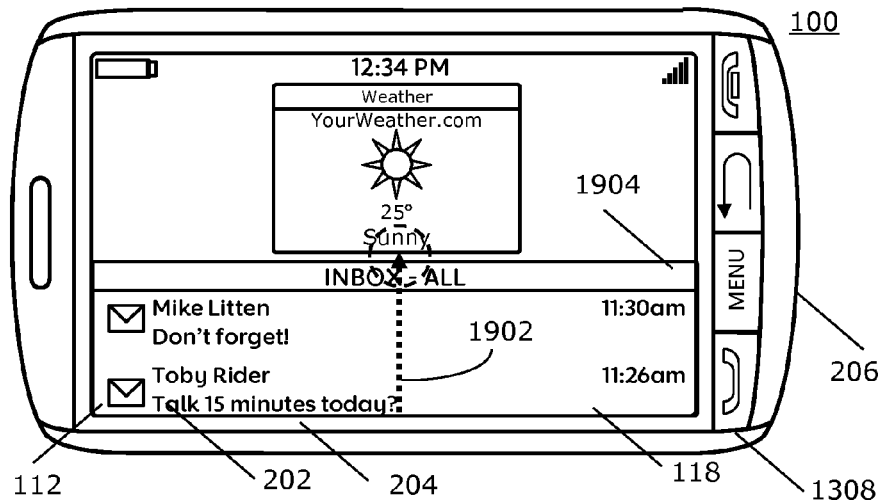

As shown in the progression of path 1402 of the gesture from FIG. 15 to FIG. 16 to FIG. 17, the second application information 1502 shifts or scrolls onto or off (of) the display 118 along with or in accordance with movement of the gesture. For example, when the gesture moves to the left, the information moves proportionately to the left; when the gesture moves to the right, the information moves proportionately to the right. Similarly, when the gesture moves up or down, the information moves proportionately up or down, respectively, such as shown in the example of FIG. 19. As described above, the first application information may shrink or shift or scroll off the display 118 as the second application information shifts or scrolls onto the display 118.

Figure 18:
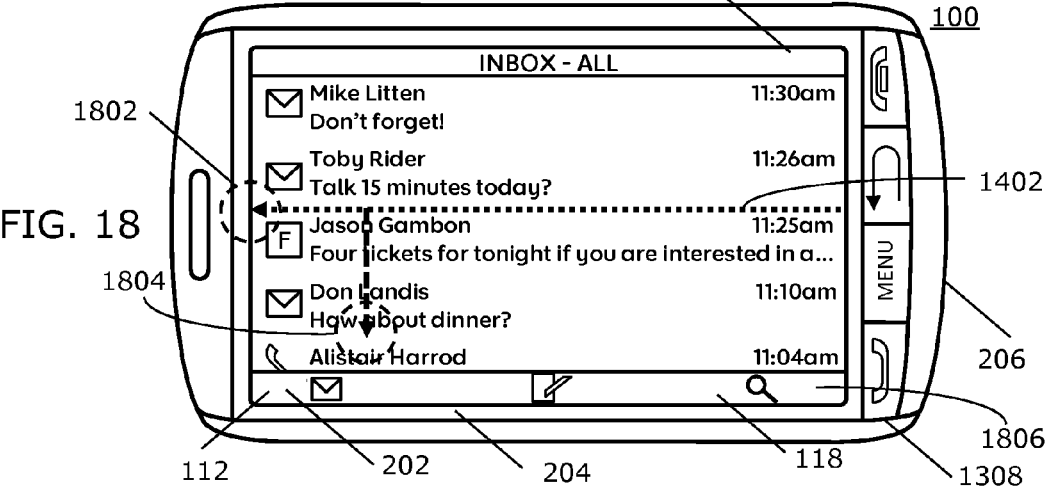

The preview or display of the second application information 1502 may end as described above, e.g., upon cessation of the gesture, when the second application information 1502 is scrolled or shifted off the display 118, and so forth. The preview terminates when the second application is opened or launched. As before, upon previewing the second application information 1502, the user may desire to open the second application, for example, to open or send a message. The second application may be opened when the gesture includes a characteristic that indicates opening of the second application. For example, the path 1402 of the gesture may continue along the optional paths 1802, 1804 shown in FIG. 18 to open the second application. The paths 1802, 1804 reflect examples of characteristics or attributes of the gesture that are interpreted by the device 100 to open the second application. One option for the gesture to open the second application is for the path 1802 of the gesture to continue in its current direction until the gesture is associated with another edge or side of the display, such as the edge or side opposite the edge or side where the display of the second application information 1502 entered the display, such as shown in FIG. 18. Another option for the gesture to open the second application is for the path 1804 of the gesture to change direction, such as toward the edge or side opposite the edge or side where the display of the second application information 602 entered the display, such as shown in FIG. 18. Another option is to automatically open the second application when the second application information covers available display area in response to the gesture, for example, when the second application information is displayed across a vertical or horizontal extent of the display area 202 or a vertical or horizontal extent of a window, frame, or field in which the second application information is displayed. A tool bar 1806 may optionally be displayed.

Second application information may scroll or shift onto the display 118 from a different edge or side, such as the bottom of the display area 202, such as shown in FIG. 19. In this example, the gesture is associated with the same edge from which the scrolling or shifting begins, although the gesture may originate from any edge or side or corner.

Different gesture types other than moving gestures may be utilized to preview the second application information. As shown in the example of FIG. 20 and FIG. 21, a gesture comprising a stationary touch or hover at a location 2002 associated with one of the corners of the display area 202 initiates the preview, which continues as described above. An icon may optionally be displayed at the location 2002. More of the second application information 1904 may optionally be displayed the longer the gesture is maintained or detected by the touch-sensitive display 118 at the location 2002. In the example of FIG. 20, the first application information is displayed same-size, and the first application information is retained at a fixed location on the display 118 as the second application information covers or replaces the first application information on the display 118. The preview may terminated, for example, when the gesture ceases to be detected or moves to a substantially different location. The second application may be opened, for example, when a second touch is detected at a location 2102 associated with a different corner, such as shown in FIG. 21.

When preview is terminated, display of the second application information may optionally be shifted off or scrolled off the display 118 along with movement of the gesture or over a period of time. The second application information may recede in the direction in which the information was displayed or may continue off the opposite edge of the display area 202 from which display began. Optionally, the display of the second application information may be immediately terminated or faded gradually off the display.

In the above examples, the gesture is a continuous gesture while displaying the at least part of the second application information without opening the second application. Although other non-continuous gestures may be utilized, a continuous gesture facilitates a more smooth display of the information as well as more quickly changing what is displayed as well as the end of the display of the second application information. The user is provided with the ability to preview as much second application information as desired without opening the second application, with the option to quickly and easily open the second application at any time with the same gesture utilized to preview the second application information. The method described herein is a natural and efficient method for previewing information with an option to open the application. Because previewing is typically faster than opening the second application, battery is conserved as well as providing a more efficient interface to the user because the user is able to obtain information without being required to open the second application.

Although the second application is opened in the above examples with a continuation of the gesture, other input may be utilized to open the second application, such as a second gesture that overlaps in time with the original gesture that indicates a preview, a menu selection, depression of a physical key, and so forth.

The second application information is displayed in the above examples starting from the right or the bottom edge or side of the touch-sensitive display 118, which has the advantage of displaying the information in a left-to-right manner or chronologically, respectively. Nevertheless, display of the second application information may start from any edge or side of the display 118. For example, display of the second application information may begin from the left side, as if the second application information appears to be below or completely obscured by the first application information, and a gesture beginning at the left reveals the second application information beginning at the left edge or side.

Figure 22:
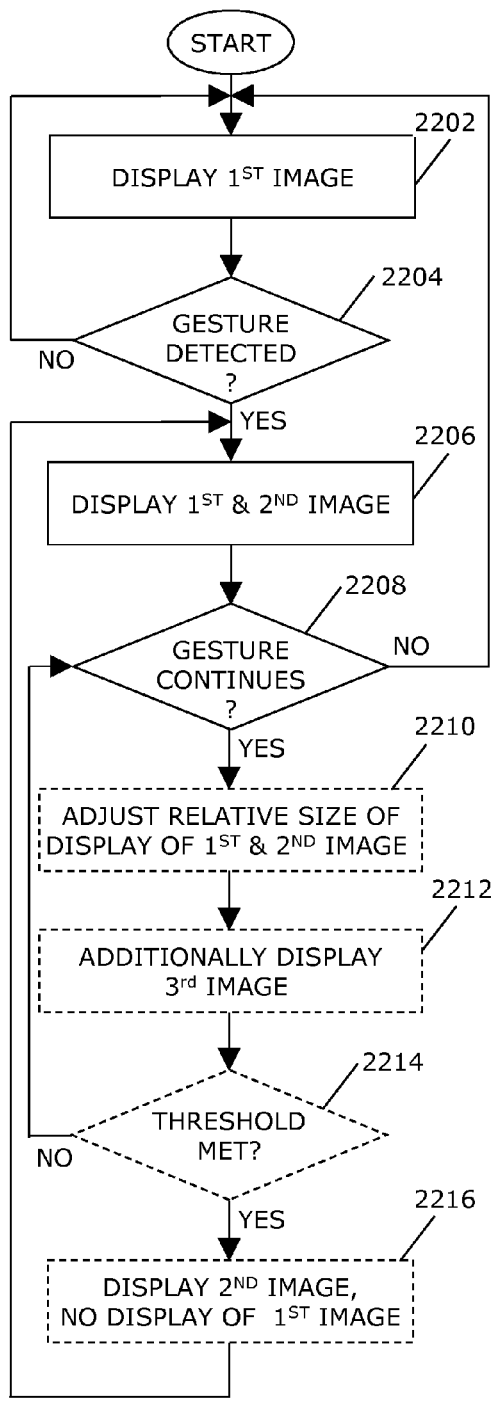

A flowchart illustrating a method of controlling display of information of images is shown in FIG. 22. The method may be carried out by software executed, for example, by the processor 102 of the electronic device, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, device, or apparatus, which may be a non-transitory or tangible storage medium.

A first image is displayed 2202 on a display, for example, on a touch-sensitive display 118. A gesture that indicates a request to display information associated with a second image is detected 2204. Detection of the gesture triggers display of the second image. The gesture may be considered to be a command associated with the second image, which command requests, controls, or causes at least part of the second image to be displayed. Characteristics of an appropriate gesture and examples of such gestures are described above.

The first image and second image may include information associated with one or more applications, information elements or features of an application, documents or files created with an application, and so forth. The images may be associated with any suitable application, such as email, text messaging, calendar, tasks, address book or contacts, media player, home or icon display page, universal inbox, or any other suitable application for which the image including information is displayed by or on an electronic device 100. An image associated with email may include information such as a list of email messages, an image associated with a calendar may include a meeting schedule, calendar day view, week view, month view, or agenda view, an image associated with an address book may include a listing of contacts, an image associated with a media player may include text, pictures, videos, or artwork related to music or other media. The first image and second image may be related to different applications or the same application. The images may be related to the same application in different ways. The images may include information of different elements, aspects, or features of the application that include different information related to the application, such as an inbox, email message, a message attachment or document, and an account listing that includes the inbox among the accounts. The different elements, aspects, or features of an application may be hierarchically organized and any part of an application may be previewed from any other part. For example, the first image may include information from an inbox, such as a universal inbox, and the second image may include information from a message from the inbox. In another example, the first image may include information from a message, and the second image may include information from the inbox. In other examples, one of the images may include information from a document associated with an email message, such as an attachment or webpage launched from a link in the email message. Another example of an image includes an account listing for one or more accounts associated with the electronic device 100. The applications and information are not limited to the examples provided.

The first image and second image are displayed 2206. For example, the second image may be displayed in increasing quantity or size as the first application information is displayed in decreasing quantity or size. The displayed second image may be a preview (or peek) of the second image, including, for example, a subset or part of all the available information for the second image. For example, when the second image is associated with an email application, the last five emails may be displayed, when the second application is an address book, the ten most often accessed contacts may be displayed, and so forth. The preview may be displayed without opening or launching the associated application, in which case the previewed information may be retrieved from stored information and/or information received via a communication network 150. Previewing or displaying without opening the associated application is typically a faster process than opening the application. The preview may alternatively be displayed when the application is already open, although not necessarily displayed.

While previewed, an image is viewable and active application functions associated with the second image may not be operable other than to display more or less of the information. For the example of previewing a messaging inbox, email messages cannot be opened and new emails cannot be initiated during a preview, although the titles, senders, and time information are viewable. For the example of previewing a calendar, existing calendar events cannot be opened and new calendar events cannot be initiated during a preview, although the titles, meeting initiator, and time information are viewable. The associated application may optionally be opened to engage active application functions. The preview of the second image is displayed, for example, for the time duration of the gesture or until the second image is fully displayed or activated, e.g., when the second image replaces the first image or fills substantially the whole display, window, frame, or field in which the information is displayed.

While the gesture continues 2208, the relative size of display of the first image and the second image may be adjusted. For example, the second image may optionally be displayed by shifting, sliding, or scrolling 2210 the second image onto the display as the first image is shifted, slid, or scrolled off (of) the touch-sensitive display 118. Similarly, the second image may optionally be displayed by shifting, sliding, or scrolling 2210 the second image off the display as the first image is shifted, slid, or scrolled onto the touch-sensitive display 118. The amount or size of display of the images may optionally take place in response to movement of the gesture. The display of the images may progressively increase in size or decrease in size along with movement of the gesture. For example, the display of the second images may progressively increase in size as the gesture continues, e.g., in a first direction, along a given path, or simply continues in time. The display of the second image may progressively decrease in size when the gesture changes direction, e.g., reverses direction. As the second image take up more space on the display or increases in size, the first image takes up less space on the display or decreases in size. For example, more of the second image may be displayed as the gesture moves in a forward direction and less information may be displayed as the gesture moves in a reverse direction. A forward direction may be, for example, the direction that the information takes as it progresses onto the display 118, and the reverse direction is the opposite direction to the forward direction.

Figure 31:
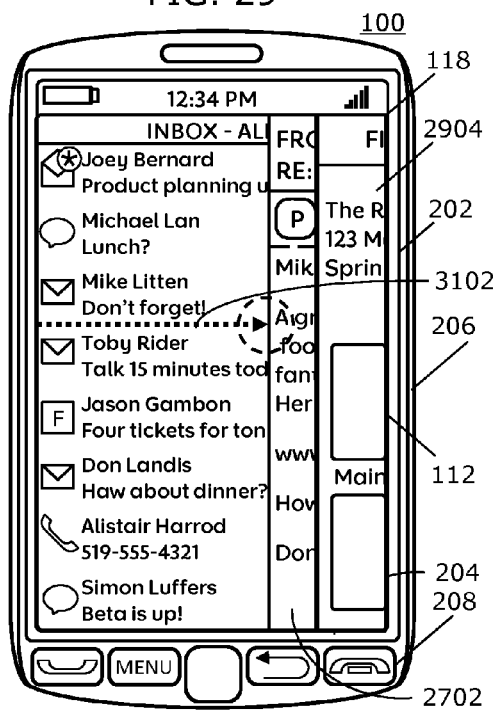
Figure 32:
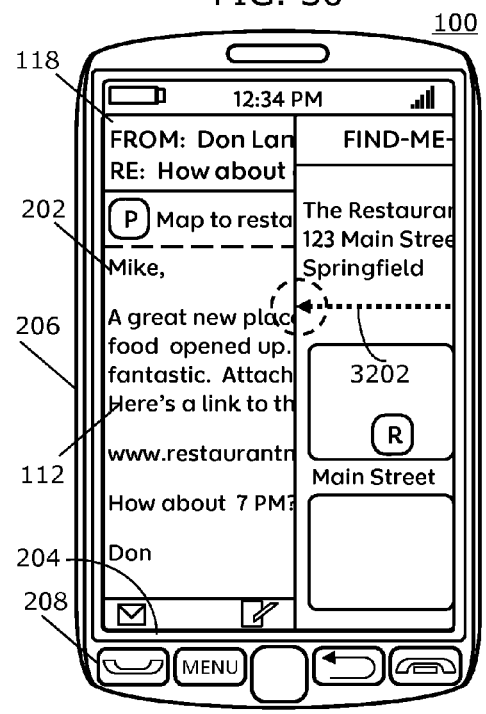

Optionally, a third image may be displayed 2212 in addition to the first image and the second image. The third image may be an intermediate image. For example, when the first image is an attachment or other document opened from a message, and the second image is at least a part of an inbox (or universal inbox), the third image may be at least part of the message. For example, the third image may be displayed between the first message and the second message, and may be displayed with the first image in a leafed format, such as shown in FIG. 31. In an example where an attachment is displayed before previewing or displaying an inbox, when the gesture is detected, the third image of the message and the second image of the inbox are displayed and the first image of the attachment is reduced. As the gesture continues, the second image is increased in size and information as the third image and the first image are reduced in size. Any number of intermediary images may be displayed.

The adjusting of display of the first and second images may continue as long as the gesture continues or until the second image is displayed and the first image is no longer displayed 2216 in response to detecting 2214 an indication to provide such a display, such as when a threshold for the gesture is met. The threshold may include a distance traveled by the gesture in one direction, a time duration of the gesture, the gesture passing a location on the display 112, and so forth. For example, the application associated with the second image may be opened at 2216. Thus, the method provides a preview of a second image without opening an application associated with the second image while providing an easily executed option to open the associated application. The preview or peek may alternatively be displayed when the application is running on the device 100, although not currently displayed.

Reducing display of an image includes displaying the image in a smaller size, in a partially or gradually transparent style, in a manner that covers, obscures, or replaces the first image with a second image, in a manner that shifts, scrolls, or slides the first image off the touch-sensitive display 118, other visual representations, or any combination thereof. Thus, reducing may include reducing the amount or quantity of information displayed for the image.

Figure 23:
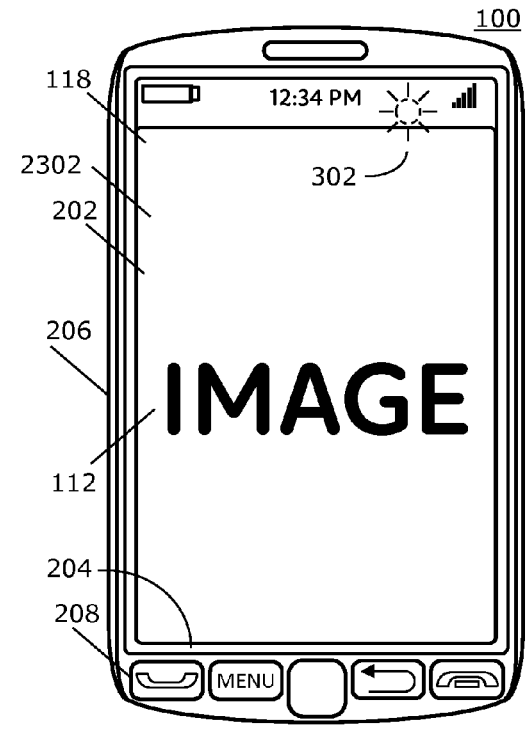
Figure 24:
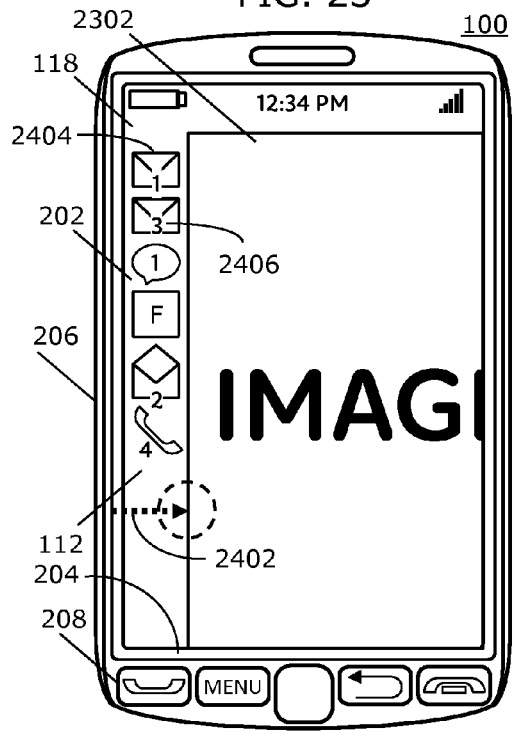
Figure 25:
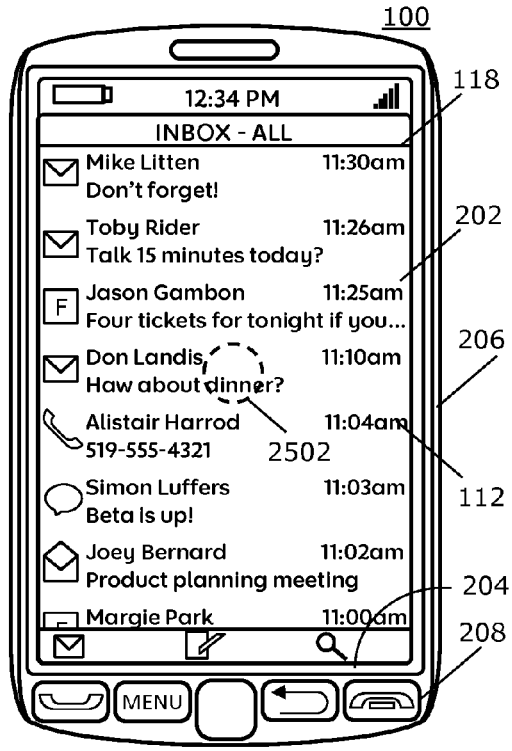

In the example of FIG. 23, while an image 2302 is displayed, a notification, such as the virtual notifier 302, is provided. The notification may be both visual and audible. The visual notification may be provided on the display 112 as a virtual notifier 302 or via a separate visual component such as a light-emitting diode. The user may wish to know what type of message arrived that caused provision of the notification. The user may gesture to view or preview a notification bar. As shown in FIG. 24, a gesture is detected along the path 2402. The gesture starts at the left edge in this example. In response to detecting the gesture in this example, one or more icons 2404 are displayed at or near the edge where the gesture began while the display of the image is reduced, as described above. The display may be gradual in that more of the icons are displayed as the gesture continues in time or distance. The icons 2404 may represent different messaging or communication applications, such as one or more email accounts, one or more text accounts or types of texts, one or more social networking applications, one or more calendar applications, one or more voice message applications, and so forth. Optionally, an indicator 2406, such as a number, may be displayed to indicate how many unread messages are present for the application. The icon 2404 displayed on top may represent the application from which the most recent message arrived, such as the message that arrived that caused the notification to be provided prior to detecting the gesture. Although the icons 2404 are displayed in a column on the left side of the display 112, the icons 2404 may alternatively be displayed in a column on the right side or in a row at the top or bottom of the display 112. Optionally, the icons 2404 may be displayed along the edge where the gesture originates.

Figure 26:
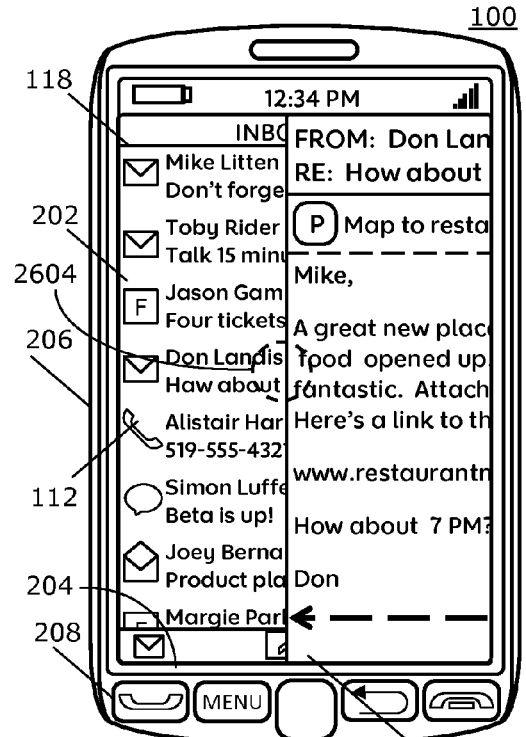

Examples relating to previewing or peeking of different images or information are shown in FIG. 25 through FIG. 34. An image of an application that is a universal inbox including a list of a plurality of elements shows the latest information from the universal inbox displayed in chronological order in FIG. 25. A gesture is detected including a touch at a location 2502 associated with an element of the inbox, which is an email in this example. Information elements for a universal inbox include email messages, text messages, calendar events, voice messages, missed call messages, social networking messages, composition windows or screens or a draft message, and so forth. Other applications may have information elements, such as a document or file created by the application, for example, a text document created by a text application, a spreadsheet created by an accounting program, a media file for a media player, and so forth. Menus or navigation windows, such as tabs or overflow lists, may also be information elements associated with an application and may be previewed. In response to detecting a gesture, at least a part of an element may be displayed or previewed while reducing display of the first image. For example, in response to detecting the gesture, an image of the email message 2602 is gradually displayed or previewed as the image of the inbox is reduced, such as shown in FIG. 26. The amount or size of the message 2602 displayed may be adjusted along with the gesture, which is at touch location 2604 in FIG. 26, e.g., as the gesture including the touch locations 2502 and 2604 continues. When the gesture discontinues prior to opening the message, the display of the message discontinues, and the image of the inbox is displayed.

Figure 27:
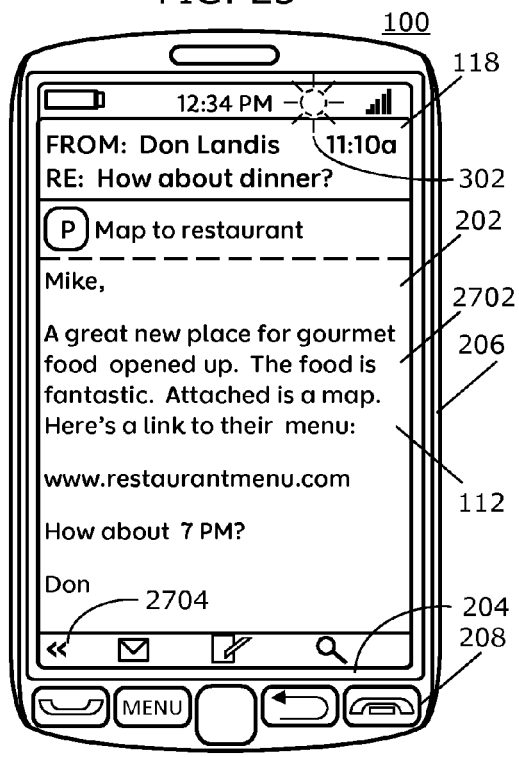
Figure 28:
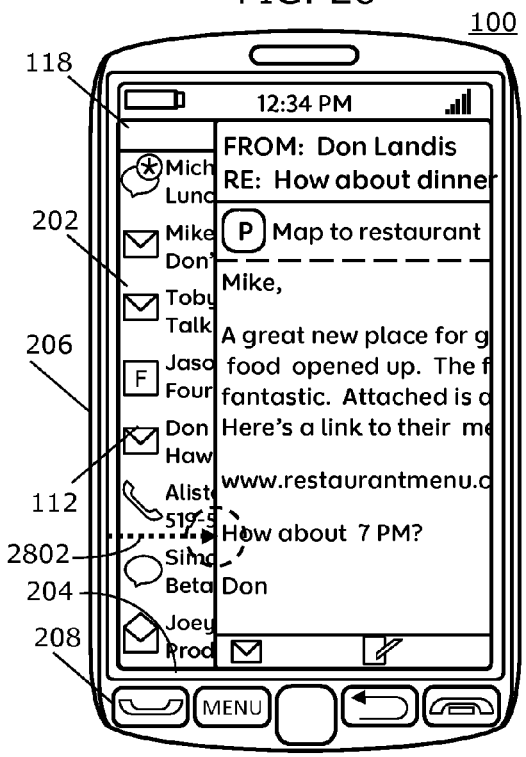

When the gesture extends across the display or meets a time or distance threshold, the message is opened for display and interaction, such as shown in FIG. 27. While the message 2702 is displayed, a notification in the form of a virtual notifier 302 is displayed as shown in FIG. 27. A gesture is detected along the path 2802 as shown in FIG. 28, in response to which gesture an image of an updated inbox is displayed or previewed while reducing display of the message. In this example, the message shifts, slides, or scrolls off the display as more of the image of the updated universal inbox is displayed or previewed. The amount of the universal inbox displayed may be progressively increased or decreased as the gesture moves along the display 118. Thus, the gesture may control how much of the image of the inbox is displayed or previewed. In this example, the gesture is discontinued prior to displaying the image of the universal inbox across the display or displaying the full width (or height) of the universal inbox. For example, the user may see enough information in the updated image of the universal inbox, e.g., the new text message from Michael Lan asking about lunch at the top of the universal inbox, and the user discontinues the gesture. The message previously reviewed, such as shown in FIG. 27, is displayed again. The image of the message may snap back across the display 112 or may gradually shift, slide, or scroll back until displayed across the display 112. Alternatively, the image of the universal inbox may be displayed across the display 112 when the gesture crosses the display or a threshold distance, time, or location of the gesture is met.

Figure 29:
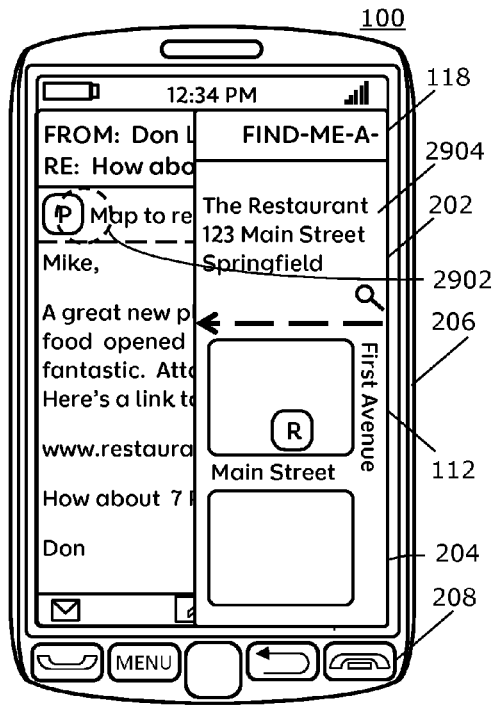

A document, such as an attachment, webpage, or contact, may be enclosed with a message such as an email. For example, while the image of the email is displayed, a gesture such as a tap is detected at a location 2902 associated with a display of a representation of a document as shown in FIG. 29. In response to the detecting, an image of the document 2904, which is a map, is displayed. The document 2904 may be scrolled, shifted, or slid onto the screen until the document 2904 covers the width display area 202 or the window, frame, or field in which the document 2904 is displayed.

Figure 30:
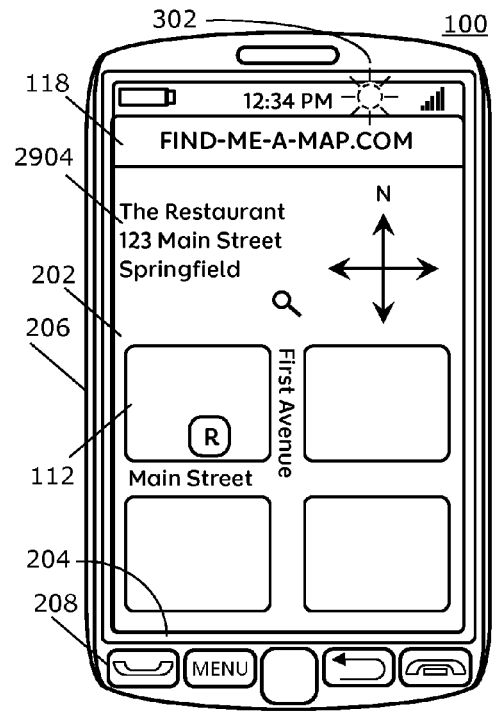

While the document 2904 is displayed, a notification in the form of a virtual notifier 302 is displayed as shown in FIG. 30. In this example, the user decides to view the inbox to see what message came in and makes a gesture to preview the inbox. The gesture is detected along the path 3102, and the image of the updated universal inbox is displayed as shown in FIG. 31. A new meeting notice is marked with * in a circle to indicate a new or unread message. The part or size of the image of the updated universal inbox displayed or previewed may progressively increase or decrease along with movement or path 3102 of the gesture. For example, more of the image of the updated universal inbox may be displayed as the gesture continues in the same direction as the path 3102 of FIG. 31, and less of the image of the updated universal inbox may be displayed as the gesture continues in a different direction such as the opposite direction of the path 3102 shown in FIG. 31. The display of the document 2904 is reduced or increased as the display of the image of the updated universal inbox is increased or decreased, respectively. Optionally, a part of the element may also be displayed in addition to the image of part of the document. As shown in the example of FIG. 31, the universal inbox is displayed or previewed while an image of part of the message 2702 is displayed along with an image of part of the document 2904 related to the element 2702, which document is the map 2904. The three images may be displayed to give the appearance of a leafed or layered arrangement of these images, with the inbox on the bottom, the message in the middle, and the map on top. The display of the part of the image of the universal inbox, and optionally the display of message 2702 (if displayed), may be discontinued when the gesture is no longer detected. When such display is discontinued the map image is displayed, such as shown in FIG. 30. When the gesture meets a threshold, such as a time, distance, or location of the gesture, the document and message, if applicable, is no longer displayed, and the image of the updated universal inbox is displayed.

Another option includes displaying or previewing a document from a related information element. For example, the map attachment may be previewed in response to detecting a gesture along the path 3202 that starts at the right edge of the display 112 and continues to the left in FIG. 32. More or less of the attachment is displayed as the gesture moves to the left or right, respectively, along the display.

Optionally, an indication of an order of the application, the element, and the related document may be displayed to facilitate navigation or previewing of these items. The indication may indicate a direction for a gesture to display at least part of the application, at least part of the element, and at least part of the document, e.g., left or right, up or down, and so forth. Optionally, one or more icons or selection items 2704, such as shown in FIG. 27, may be displayed to navigate or preview between images or layers of an application, such as the main application information, an information element, and a document. When a touch is detected that is associated with the icon 2704, the display is changed as either information is displayed or previewed from a different image or layer.

As described above, a visual notification may be provided in response to receiving an incoming message or communication, such as an email or text message, a missed phone call, a meeting notice, a social networking message, and so forth. The visual notification, also referred to as an indication or notifier, may be provided by a physical element separate from the display, such as a light emitting diode (LED), light pipe, or other light source, which may be disposed in a housing 206 of the electronic device 100. Such a light source may blink, provide different colors, or other visual indication of information related to the incoming message or communication.

Figure 33:
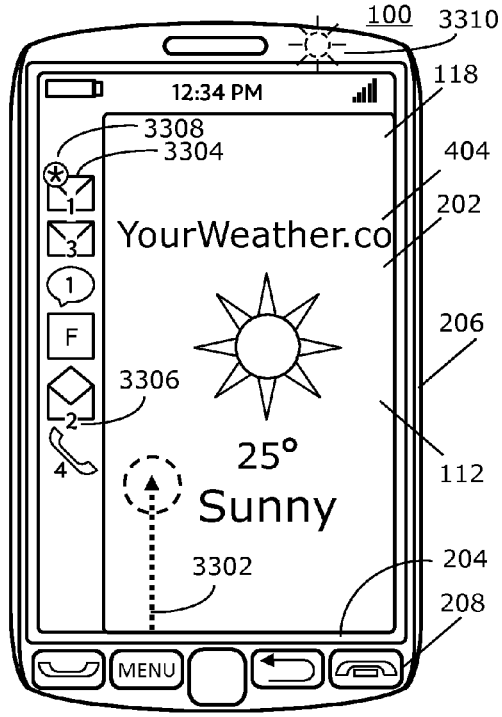

The visual notification may alternatively or additionally be displayed on the display 112 of the electronic device 100. A displayed visual notification may comprise a symbol, for example, an asterisk or star in a circle with a red-colored fill or any other symbol of any suitable size, shape, color, and so forth. The displayed visual notification may be displayed in association with an icon corresponding to the received communication, such as on or near an icon associated with an email, text messages, phone calls, and so forth. The icon may be one of a plurality of different icons for different applications. The icon may be the icon that selects or launches the application or an icon that does not select or launch the application. Alternatively, the icon may be one of a plurality of notification icons that are displayed for a plurality of applications, such as communications applications. Notification icons are typically few in number and smaller in size than application icons found on a home page. The visual notification may optionally be displayed in association with an inbox entry for the received communication. Multiple visual notifications may be displayed, for example, a visual notification may be displayed for each of a number of different applications. Multiple visual notifications may be provided for a single received communication. Visual notifications may be displayed in conjunction with icons in a panel of icons or a panel or bar of visual notification icons, such as a panel of icons that provide visual notifications for a plurality of communications applications, such as email, text, phone, calendar, social networking, and so forth. The panel of icons may be displayed in response to detecting a gesture, such as shown in FIG. 5, FIG. 9, FIG. 14, FIG. 24, or FIG. 33. The visual notification may comprise a number indicating a quantity of unread messages, e.g., for an application, such as shown in FIG. 33. Other forms of visual notification may be provided.

Effective utilization of visual notifications involves discontinuing, turning off, deactivating, or disabling the visual notification. Thus, visual notifications may be repeated utilized over time. Inadvertent or accidental discontinuation of a visual notification is advantageously avoided to provide a user with adequate access to the visual notification.

For example, first application information, e.g., weather application information in this example, may be displayed, such as shown in FIG. 3. A visual notification 3310 is displayed in the form of a blinking LED in response to the electronic device 100 receiving a communication, which is an email in this example. While the first application information is displayed, a gesture is detected. The gesture in this example has an origin associated with a lower edge of the display area 202, e.g., a swipe that starts in the non-display area 204 and continues onto the display area 202 as shown in FIG. 33. In this example, the path 3302 of the gesture is indicated by the dotted line and arrow. The gesture need not be provided in response to the notification and may be detected at any time. As the gesture continues, the first application information is gradually scrolled off or reduced from display 112 along with the gesture, as other information scrolls onto the display 112.

In the example of FIG. 33, a panel of visual notification icons 3304 is displayed as the first application information shifts off the display 112. The visual notification icons in this example include, from top to bottom, visual notification icons for a work email account, a personal email account, a text messaging account, a social networking account, a calendar, and a wireless phone account. A visual notification comprising a symbol 3308 is displayed in conjunction with the work email account in this example, providing an additional visual notification to the LED visual notification 3310. The panel of visual notification icons 3304 may be displayed in other ways.

When the touch location of the gesture is at the touch location shown by the dotted circle in FIG. 33, the gesture may be discontinued, and the first application information is again displayed, such as shown in FIG. 3. If the gesture is subsequently repeated, the panel of panel of visual notification icons 3304 is displayed again, although the visual notification comprising the symbol 3308 is not displayed when the previously detected gesture has a characteristic that results in discontinuing displaying the visual notification.

The characteristic of the gesture may be identified or selected such that inadvertent or accidental discontinuation of a visual notification is avoided while peeking or previewing visual notification icons or a second application. For example, a characteristic may be selected to provide a user with adequate time to view the visual notification. For example, visual notifications may be discontinued when an icon is selected corresponding to the visual notification, such as when the gesture is associated with the icon, e.g., a gesture that ends at an icon. Other characteristics include a distance or length of at least part of the gesture, a distance between an edge of the touch-sensitive display 118 and a touch location of the gesture, a time duration of the gesture, a combination of time and distance of the gesture, a shape of the gesture, a change in direction of the gesture, when a location of the gesture is associated with an edge of the touch-sensitive display 118 or a 3D display, a gesture that opens an inbox such as a universal inbox, a user-selected characteristic in a profile on the electronic device 100, an amount of second application information displayed in response to the gesture and optionally how long the second application information is displayed, a gesture that opens second application, a gesture that ends display of the first application information, and other characteristics that, for example, give a user enough time to read or recognize the information associated with the received communication. A few examples include a distance of a percentage, such as half the width, of a display, a distance of a part of a gesture that extends in the direction in which characters are read, one second display of information associated with a visual notification such as at least part of an email's sender or subject line, a gesture that changes direction twice, a gesture that continues off any edge of the touch-sensitive display 118, a gesture that displays the panel of visual notification icons for a period of time, such as 1 second or longer, or any combination of characteristics. The characteristic may vary based on the type of application associated with the visual notification. For example, a missed phone call may utilize a characteristic that displays a peek or preview of the phone number, whereas a meeting notice may utilize a characteristic that displays a peek or preview of the meeting organizer, subject, or date and time, and an email may utilize a characteristic that displays an email's sender or subject line.

Figure 34:
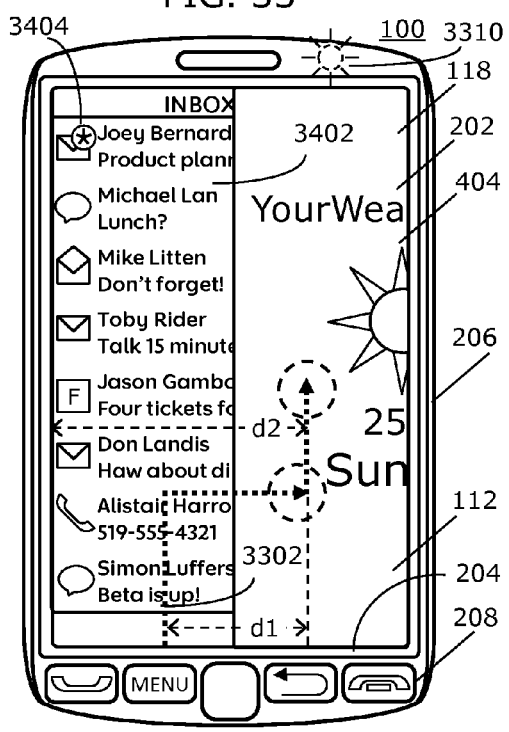

A few examples of characteristics indicating when a visual notification may be discontinued are shown in FIG. 34. The visual notification(s) 3308, 3310 may be discontinued when the second application information 3402 is displayed. The visual notification(s) 3308, 3310, 3404 may be discontinued when a distance d1 of a part of the gesture meets a threshold distance. The visual notification(s) 3308, 3310, 3404 may be discontinued when a distance d2 between an edge of the display 112/118 and the gesture meets a threshold distance. The visual notifications 3308, 3310, 3404 may be discontinued when the name of the sender of the email associated with the visual notification 3404 is displayed. The visual notifications 3308, 3310, 3404 may be discontinued when the gesture changes direction, e.g., when the gesture changes from vertical direction to a horizontal direction or from a horizontal direction to a vertical direction.

Figure 35:
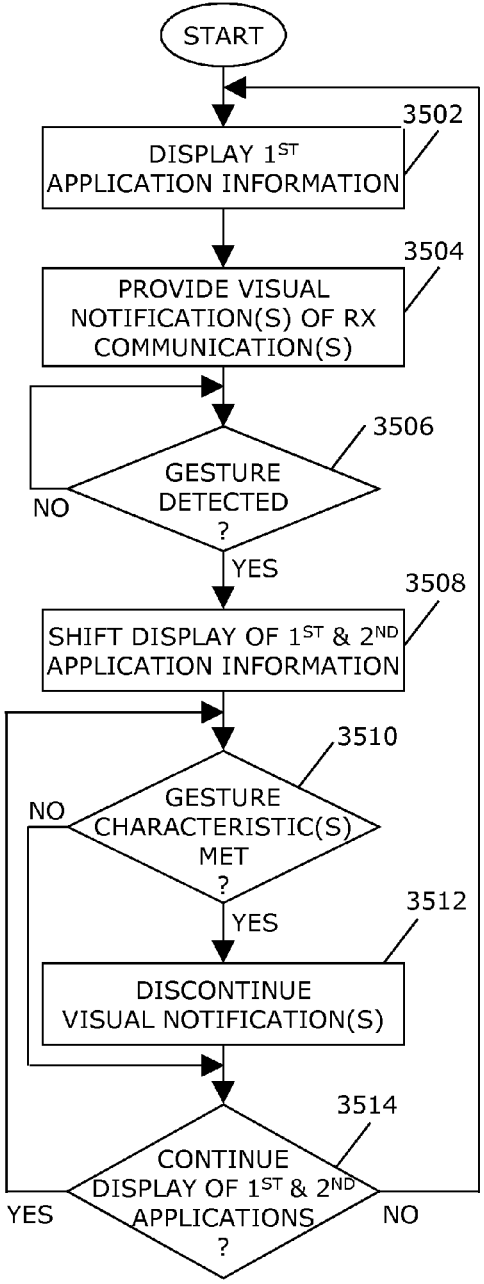

A flowchart illustrating a method of controlling display of information of images and one or more visual notifications of a received communication is shown in FIG. 35. The method may be carried out by software executed, for example, by the processor 102 of the electronic device 100, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, device, or apparatus, which may be a non-transitory or tangible storage medium.

Information associated with a first application is displayed 3502 on a display, for example, on a touch-sensitive display 118. The image or information may includes information associated with any suitable application or aspect or element of an application, such as email (also referred to as electronic mail), text messaging, calendar, tasks, address book or contacts, media player, home page, icon (including active icons) or widget display page, inbox (also referred to as a mailbox, which may be a universal inbox that displays information for a plurality of communications applications), or any other suitable application in or for which information is displayed by or on an electronic device 100. Information associated with email may include a list of email messages, information associated with a calendar may include a meeting schedule, calendar day view, week view, month view, or agenda view, information associated with an address book may include a listing of contacts, information associated with a media player may include text, pictures, videos, or artwork related to music or other media. The applications and information are not limited to the examples provided.

In response to receiving a communication, such as an email, text message, phone call, or other type of communication, the electronic device 100 provides 3504 one or more visual notification of the received communication. The visual notification may include one or more of a lighted component 3310 disposed in a housing 206 of the electronic device, a symbol 3308 displayed on a panel of visual notification icons 3304, a symbol displayed on an inbox entry, a symbol displayed on an application icon, and so forth. Not all visual notifications may be displayed at the same time. Providing, turning on, activating, or initiating of a visual notification may occur based on what information is currently displayed.

A gesture that indicates a request to display information associated with a second application is detected 3506. Detection of the gesture triggers display of the second application information. The gesture may be considered to be a command associated with the second application, which command requests, controls, or causes at least part of the second application information to be displayed. Characteristics of an appropriate gesture and examples of such gestures are described above. The second application may be any suitable application, such as described above. The second application information associated is also described above.

The first application information and second application information are displayed 3508, where the first application information is shifted off the display 112 as the second application information is shifted onto the display 112. For example, the second application information may be displayed in increasing quantity as the first application information is displayed in decreasing quantity. The displayed second application information may be a preview (or peek) of the second application information, including, for example, a subset or part of all the available second application information. For example, the second application may be an inbox, such as a universal inbox, and a page of inbox entries is displayed. The preview may be displayed without opening or launching the second application, in which case the previewed information may be retrieved from stored information and/or information received via a communication network 150. Previewing or displaying without opening the second application is typically a faster process than opening the second application. The second application may be running on the electronic device, and some of the information is displayed as described herein. The amount of information displayed from the first application and the second information may be controlled in response to the touch location. For example, as a user moves his or her finger along the touch-sensitive display 118, the amount of information displayed between the first application and the second application changes, such that the touch location affects how much of the second application information and how much of the first application is displayed, thus controlling a peek or preview of second application information while displaying first application information. In response to detecting the gesture, a first part of an inbox is displayed while reducing display of the first application information, including at least partially displaying information associated with the received communication. A panel of notification icons 3304 may optionally be displayed before the second application information is displayed, such as shown in FIG. 33.

Based on a characteristic of the gesture 3510, e.g., when one or more characterics of the gesture are met, the electronic device 100 discontinues 3512 providing the visual notification(s). Optionally, other notifications, such as audible and tactile notifications, may also be discontinued when the visual notifications are discontinued or at a different time than when the visual notifications are discontinued. Characteristics of the gesture related to discontinuing, turning off, deactivating, or disabling the visual notification are described above. Different visual notifications may utilize the same or different characteristics for inactivating the visual notification. For example, the characteristic for discontinuing providing the visual notification for a discrete light source, such as the LED 3310, may be different from the characteristic for discontinuing providing the visual notification for a visual notification icon or the characteristic for discontinuing providing the visual notification for an inbox entry notification or the characteristic for discontinuing providing the visual notification for an icon displayed in a window(s) or page(s) of icons such as a home page. While the gesture continues, the first and second application information is displayed 3514. When the gesture is terminated, the process continues at 3502. Alternatively, the gesture may launch or open the second application, at which time display of the first application information is discontinued.

Alternatively, the method comprises displaying information associated with an application on an electronic device and providing a first visual notification of a received communication, wherein the first visual notification comprises illuminating a light source disposed in a housing of the electronic device. A second visual notification of the received communication is provided, wherein the second visual notification comprises a symbol displayed in association with a displayed icon associated with the received communication. A gesture is detected. In response to detecting the gesture, a first part of an inbox is displayed while displaying less of the information, including at least partially displaying information associated with the received communication. Based on a first characteristic of the gesture, providing the first visual notification is discontinued. Based on a second characteristic of the gesture, providing the second visual notification is discontinued. The first characteristic may be different than the second characteristic. The first visual notification and the second visual notification may be discontinued at different times.

Alternatively, the method comprises displaying information associated with an application on an electronic device and detecting a gesture. In response to detecting the gesture: a plurality of icons associated with a plurality of applications is displayed; a visual notification of a received communication in association with a first icon associated with the received communication is displayed; and a first part of an inbox is displayed while reducing display of the information, including at least partially displaying information associated with the received communication. Based on a characteristic of the gesture, display of the visual notification is discontinued. A second visual notification of a second received communication in association with a second icon associated with the second received communication may be displayed. Display of the second visual notification may be discontinued when the second icon is selected.

In another example, the element may be a compose screen or window for a message or calendar event. The user may peek or preview the inbox from the compose screen or window with a gesture. In response to detecting a gesture, an image of the inbox is displayed or previewed as display of the compose screen is reduced. When the gesture meets a threshold length or distance, including a gesture across the width of the display, the image of the inbox is open, the compose screen or window is closed, and the element is saved as a saved element when the element includes unsaved changes. An indication of the saved element may be displayed with the image of the inbox. For example, when an email is composed but not saved, and the gesture meets the threshold, the email is automatically save, and an indication of the saved message is displayed as part of the image of the inbox.

Previewing or displaying one image while displaying another in response to a gesture may include displaying the same side of each image, e.g., displaying the left sides, the right sides, the tops, or the bottoms of both images, while the opposite sides of the images are not displayed. For example, as the gesture continues, one side of the previewed image increases in size, e.g., more information is displayed in a larger area, while the opposite side of the image, the part that is not displayed, is reduced or decreases in size. Alternatively, the images may be placed end to end as the second image is displayed. Unlike progressing or sliding pages or pictures by swiping or flicking, previewing or displaying of one image while displaying another in response to a gesture as described herein provides control of how much of the second image is displayed, how fast the second image is displayed, and how long the second image is displayed or persists, including an option to quickly end the display of the second image by ending the gesture and an option to open or activate an application associated with the second image.

Previewing or displaying one image while reducing display of another image in response to a gesture is different from displaying an animation or cascading images onto a screen in response to a flick or swipe. Previewing persists the display of the previewed image or application in a controllable manner, instead of an animation or cascade that once started, runs to completion without being able to control what or how the images are displayed, e.g., the displayed is predetermined and unchangeable. Previewing may include statically displaying some information or part of one image in one area while the other image is dynamic or moves across another area of the display as the gesture continues. Described another way, the previewed image may be displayed beginning at one edge of the image, and the information that persists is being displayed stays at the same location on the display, although more information for the image is displayed as the gesture continues. The other image, which was displayed before the preview, may be dynamically displayed, in that the information of this image that persists in being displayed moves across the display, although less information for this image is displayed as the gesture continues. The total area in which the two images are displayed remains the same, although the area for each image changes, i.e., the area in which one image is displayed increases as the area in which the other image is displayed decreases. Typically, the amount of information displayed in the areas also changes, e.g., more information is displayed in the area that increases for the previewed image. The non-previewed image may be reduced by shrinking the displayed information, virtually covering, obscuring, or concealing the information or replacing it with the information from the previewed image, or any other method of reducing the information displayed for the image or application, such as described above.

In one example, a first quantity of information of a first image is displayed in a first area including a second area adjacent to a third area. In response to detecting a gesture, a second quantity of information of a second image is displayed in the second area while a third quantity of information of the first image is displayed in the first area, wherein the third quantity of information is a subset of the first quantity of information. As the gesture continues, the second quantity of information increases as the third quantity of information decreases. The second area increases in size as the third area decreases in size. The second image includes a second part opposite to the first part, and the second part of the second image is not displayed when the first part of the second image is initially displayed.

In another example, a method comprises displaying a first image in a first area, wherein the first area includes a second area adjacent to a third area, wherein first information is displayed in the first area and second information is displayed in the second area, detecting a gesture, and in response to detecting the gesture, displaying a second image in the second area while displaying the first information of the first image in the first area. A size of the second area may be increased in size and more information in the second image may be displayed while the size of the first area may be decreased in response to movement of the gesture. Display may be static in one of the first area and the second area, and display may be dynamic in the other of the first area and the second area.

In another example, a method comprises displaying a first image on a touch-sensitive display, detecting a gesture, and in response to detecting the gesture, displaying a part of a second image and displaying a first part of the first image adjacent to the part of the second image and discontinuing display of a second part of the first image. More of the second image may be progressively displayed and displaying progressively less of the first image may be progressively displayed as the gesture continues to be detected. Display of the second image may discontinue when the gesture is no longer detected. Optionally, in response to detecting that the gesture meets a threshold, the second image is displayed and display of the first image is discontinued. The part of the second image may be displayed adjacent to a first edge of the touch-sensitive display. Prior to detecting the gesture, the first part of the first image may be displayed adjacent to a first edge of the touch-sensitive display, and, in response to detecting the gesture, the part of the second image may be displayed adjacent to the first edge and displaying the first part of the first image adjacent to the second image. The first image may include a second part of the first image opposite to the first part of the first image. As the gesture continues, an area of display of the part of the second image may progressively increase in size. As the gesture continues, an area of display of the first part of the first image may progressively decrease in size. An area of display of the part of the second image may progressively increase in size or decreases in size along with movement of the gesture. A quantity of information displayed in the second image may progressively increase in size or decreases in size along with movement of the gesture.

The first image and the second image may include any combination of information from applications, information elements of applications, and documents related to applications. The following are a few examples of image pairs. The first image may include an image of an inbox, and the second image may include an image of an email message. The first image may include an image of an email message, and the second image may include an image of an inbox. The first image may include an image of an attachment to an email message, and the second image may include an image of an inbox. The first image may include an image of an email message, and the second image may include an image of attachment to an mail message. The method of claim 36, wherein the first image includes an image of an attachment to an email message, and the second image includes an image of an email message. One of the first image and the second image may include an image of an inbox including a plurality of notifications of messages from a plurality of different message applications. The second image may include one of an email message, a text message, a social network message, a phone message, and a calendar event message.

The above examples describe displaying a first application or image and previewing second application information or image, for example without opening the second application, or with an option to open the second application in response to detecting a gesture or characteristics of the gesture. The displayed selection items of a previewed application or image may be inactive (e.g., no function is performed when a touch is detected that is associated with a displayed selection item) or active (e.g., one or more functions are performed when a touch is detected that is associated with a displayed selection item). Alternatively, the selection items may initially be inactive and later change to being active. Optionally, different gestures or gestures associates with different edges or sides or corners may preview multiple different applications or images. For example, a gesture associated with the right edge previews a messaging inbox, a gesture associated with the left edge previews a calendar, a gesture associated with the bottom edge previews an address book, and a gesture associated with the top edge previews a user-selected application. The user may be provided with the option to assign the application with the desired edge or side or corner. Optionally, the side from which the gesture begins may hierarchically display, preview, or reveal related images. For example, a gesture beginning along the one side may preview images in one direction of the hierarchy, and a gesture beginning along the opposite side may preview images in the opposite direction of the hierarchy.

Although the method is advantageous for portable electronic devices due to the limited display size on a portable electronic device, such as a smartphone, the method may be applied to other electronic devices that have a larger display size.

Although the above examples illustrate various different features, the features of any example may be utilized with any other example unless the features conflict. For example, features of FIG. 2 through 11 or FIG. 23 through FIG. 32 may be utilized in a landscape orientation, and features of FIG. 13 through 21 may be utilized in a portrait orientation. Other features are interchangeable but are too numerous to identify briefly.

Detection of the gesture controls how much of the second image or application is displayed. For example, the detected location or movement of the gesture may control the size of the image or application information that is displayed, previewed, or revealed. Shifting, sliding, or scrolling of information or an image onto a display area generally includes gradually moving or progressively adding information or an image onto a display area. Shifting, sliding, or scrolling of information or an image off (of) a display area generally includes gradually moving or progressively removing information or an image from a display area. The shifting, sliding, or scrolling of second application information or a second image onto the display may cause shifting or scrolling of first application information or a first image off the display or may cover or replace the first application information or first image, such that the first application information or first image appears to be below the second application information or second image. The display of the information associated with a first application or first image may be reduced as the display of the information associated with the second application or second image is increased. The information associated with the second application or second image may shift onto the touch-sensitive display from a first edge of the touch-sensitive display while the information associated with the first application or first image shifts off a second edge of the touch-sensitive display, wherein the second edge is opposite the first edge. Icons or information other than the first application information or first image may also scroll or shift onto or off of the display as the first application information or first image or the second application information or second image scrolls onto or off of the display, changes size, and so forth. The first application information or first image may be displayed from one edge of the device as the second application information or second image moves away from or is concealed beginning at the same edge of the device. The images or applications may be previewed or displayed as if each image or application is in a different layer and display of one or more of the images or applications is reduced to reveal the image or application in the layer below. As shown in the examples, the different images or information for different applications or application parts are displayed in separate, non-overlapping windows, frames, fields, or areas of the display. The windows, frames, fields, or areas are advantageously adjacent to each other, although they need not be adjacent.

The second application information or image that is previewed may be adjusted by the user. For example, the use may identify the quantity of information to be previewed, e.g., 10 latest unread emails, 5 most recently accessed contacts, and so forth.

Although the drawings show examples of location of various types of information, such as visual notifications or visual notification icons, the location and direction of information when previewed or peeked, and other locations, the information may be displayed in other locations or orientations than shown or specifically described herein. For example, visual notifications or visual notification icons may displayed along any side of the display, such as top, bottom, left, or right, in the middle of the display, in a ghosted or animated manner, or with other forms of visual presentation. Such information may vary when displayed in portrait or landscaped orientation. Information may be previewed or peeked in from any side of the display, including the top, bottom, left, or right sides. Touches such as gestures may be utilized having any suitable direction(s), shape(s), starting point, and/or ending point.

The terms left, right, top, bottom, and so forth are utilized herein for purpose of providing a perspective for reference but are not otherwise limiting.

The present disclosure may be embodied in other specific forms without departing from its spirit or essential characteristics. The described examples are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
    displaying information associated with an application in a display area of oar an electronic device;
    providing a visual notification of a received communication;
    detecting a continuous gesture at least partially extending across the display area;
    in response to detecting the continuous gesture in a first direction, reducing the displayed information to a first portion of the display area;
    in response to detecting the continuous gesture in a second direction different than the first direction, displaying a first part of an inbox in a second portion of the display area in which the displayed information was presented prior to being reduced to the first portion, the first part of the inbox to at least partially display information associated with the received communication; and
    in response to detecting a discontinuing characteristic of the continuous gesture, discontinuing providing the visual notification.

2. The method of claim 1, further comprising displaying a plurality of icons in the first part of the inbox, the plurality of icons including a first icon associated with the received communication, wherein the visual notification comprises displaying a symbol in association with the first icon.

3. The method of claim 1, further comprising displaying a plurality of icons in response to detecting the continuous gesture, the plurality of icons including a first icon associated with the received communication, wherein the visual notification comprises displaying a symbol in association with the first icon.

4. The method of claim 1, wherein the continuous gesture is detected by a touch-sensitive display of the electronic device.

5. The method of claim 1, wherein the discontinuing characteristic is a distance between an edge of a display and a touch location of the continuous gesture.

6. The method of claim 1, wherein the discontinuing characteristic is a time duration of the continuous gesture.

7. The method of claim 1, wherein the discontinuing characteristic is a combination of time and distance.

8. The method of claim 1, wherein the discontinuing characteristic is a change in direction of the continuous gesture.

9. The method of claim 1, wherein the discontinuing characteristic is a location associated with at least one edge of a touch-sensitive display.

10. The method of claim 1, wherein the discontinuing characteristic causes the inbox to be opened and the information is no longer displayed.

11. The method of claim 1, wherein the visual notification comprises illuminating a light source disposed in a housing of the electronic device and separated from a display.

12. The method of claim 1, wherein the visual notification comprises displaying a symbol on a display of the electronic device.

13. The method of claim 1, wherein the visual notification comprises displaying a symbol in association with an inbox entry for the received communication.

14. The method of claim 1, wherein the visual notification comprises displaying a symbol in association with an icon associated with the received communication.

15. The method of claim 1, wherein the visual notification comprises displaying a symbol in association with an icon of a plurality of icons displayed in response to detecting the continuous gesture.

16. The method of claim 1, wherein display of the inbox progressively increases in size and the displayed information progressively decreases in size along with movement of the continuous gesture or the inbox progressively decreases in size and the displayed information progressively increases in size along with movement of the continuous gesture.

17. The method of claim 1, wherein the inbox is associated with two or more communication applications.

18. A non-transitory computer-readable medium having computer-readable code executable by at least one processor of the portable electronic device to perform the method of claim 1.

19. The method of claim 1, further comprising, in response to detecting the characteristic of the continuous gesture, displaying the information associated with the first application in the display area and removing display of the first part of the inbox from the display area without activating a second application associated with the received communication.

20. The method of claim 1, further comprising gradually displaying more of the inbox information as a length of the gesture increases in the second direction.

21. The method of claim 1, further comprising detecting a length of the continuous gesture and displaying an amount of information associated with the inbox proportional the detected length of the continuous gesture.

22. The method of claim 1, further comprising detecting a duration of time of the continuous gesture and displaying an amount of information associated with the inbox that is proportional to the detected duration of time.

23. The method of claim 1, wherein the discontinuing characteristic of the continuous gesture comprises detecting the continuous gesture in a third direction different than the first and second directions or detecting a termination of the continuous gesture.

24. The method of claim 1, wherein, in response to detecting the continuous gesture in a third direction different than the first direction and the second direction, reducing display of the inbox and increasing display of the information associated with the application.

25. The method of claim 24, wherein the second direction is opposite the third direction.

26. A method comprising:
displaying information associated with an application on an electronic device;
providing a first visual notification of a received communication, the first visual notification comprising illuminating a light source disposed in a housing of the electronic device;
providing a second visual notification of the received communication, the second visual notification comprising a symbol displayed in association with a displayed icon associated with the received communication;
detecting a continuous gesture across at least a portion of the display;
in response to detecting the continuous gesture, reducing display of the information to a first portion of the display;
in response to detecting a change of direction of the continuous gesture, presenting a first part of an inbox in a second portion of the display area adjacent the first portion, the first portion of the display area presenting the information associated with the application prior to reducing the information to the second area, the first part of the inbox including information associated with the received communication;
based on a first characteristic of the continuous gesture, discontinuing providing the first visual notification; and
based on a second characteristic of the continuous gesture, discontinuing providing the second visual notification.

27. The method of claim 26, further comprising displaying a plurality of icons in response to detecting the change of direction of the continuous gesture, the plurality of icons including the displayed icon associated with the received communication.

28. The method of claim 26, wherein the first characteristic is different from the second characteristic.

29. The method of claim 26, wherein the first visual notification and the second visual notification are discontinued at different times.

30. The method of claim 26, wherein the first characteristic is at least one of time or distance.

31. A method comprising:
displaying information associated with an application in a display of an electronic device;
displaying a first visual notification of a received communication in association with a first icon associated with the received communication;
detecting a gesture that begins at an edge of the display and continues across at least a portion of the display along a first direction and a second direction different than the first direction;
in response to detecting the gesture along the first direction; reducing display of the information to a first portion of the display;
in response to detecting the gesture along the second direction;
displaying a first part of an inbox having a plurality of icons associated with a plurality of applications such that only the first part of the inbox and the reduced displayed information are presented on the display, the first part of the inbox including information associated with the received communication and the information associated with the received communication providing a second visual notification; and
based on a characteristic of the gesture, discontinuing displaying the first visual notification and the second visual notification.

32. The method of claim 31, further comprising displaying a second visual notification of a third received communication in association with a second icon associated with the second received communication.

33. The method of claim 32, further comprising discontinuing displaying the third visual notification when the second icon is selected.

34. The method of claim 31, wherein displaying the first part of the inbox comprises gradually displaying more of the in box, while displaying less of the information, along with movement of the gesture.

* * * * *

UNITED STATES PATENT AND TRADEMARK OFFICE
CERTIFICATE OF CORRECTION

| | | |
|---|---|---|
| PATENT NO. | : 9,015,641 B2 | Page 1 of 1 |
| APPLICATION NO. | : 13/584350 | |
| DATED | : April 21, 2015 | |
| INVENTOR(S) | : Andrew Douglas Bocking et al. | |

It is certified that error appears in the above-identified patent and that said Letters Patent is hereby corrected as shown below:

In the Claims

In Column 25, Line 58, In Claim 1, after "of" delete "oar".

In Column 27, Line 10, In Claim 21, before "the" insert -- to --.

In Column 34, Line 51, In Claim 34, delete "in box," and insert -- inbox, --, therefor.

Signed and Sealed this
Twenty-second Day of September, 2015

Michelle K. Lee
*Director of the United States Patent and Trademark Office*